(12) United States Patent
Tanaka et al.

(10) Patent No.: US 11,183,948 B2
(45) Date of Patent: Nov. 23, 2021

(54) SERIES MULTIPLEX INVERTER

(71) Applicant: Mitsubishi Electric Corporation, Tokyo (JP)

(72) Inventors: Kazufumi Tanaka, Tokyo (JP); Kazutoshi Kurahashi, Tokyo (JP); Yoshiaki Yamamoto, Tokyo (JP); Shuta Ishikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/962,254

(22) PCT Filed: Jan. 29, 2018

(86) PCT No.: PCT/JP2018/002805
§ 371 (c)(1),
(2) Date: Jul. 15, 2020

(87) PCT Pub. No.: WO2019/146124
PCT Pub. Date: Aug. 1, 2019

(65) Prior Publication Data
US 2021/0067054 A1    Mar. 4, 2021

(51) Int. Cl.
*H02M 7/49* (2007.01)
*H02M 7/5387* (2007.01)

(52) U.S. Cl.
CPC ......... *H02M 7/49* (2013.01); *H02M 7/53871* (2013.01)

(58) Field of Classification Search
CPC ............ H02M 7/00; H02M 7/02; H02M 7/12; H02M 7/42; H02M 7/48; H02M 7/49; H02M 7/5387; H02M 74/53871
See application file for complete search history.

(56) References Cited

U.S. PATENT DOCUMENTS

| 10,985,672 | B2 * | 4/2021 | Miyamoto | ............ H02M 7/483 |
| 2021/0010707 | A1 * | 1/2021 | Takahashi | ............... H02M 1/12 |
| 2021/0075338 | A1 * | 3/2021 | Tanaka | .................. H02M 5/458 |

FOREIGN PATENT DOCUMENTS

| JP | H0538154 A | 2/1993 |
| JP | H1198856 A | 4/1999 |

(Continued)

OTHER PUBLICATIONS

International Search Report (PCT/ISA/210) dated Mar. 13, 2018, by the Japan Patent Office as the International Searching Authority for International Application No. PCT/JP2018/002805.

(Continued)

*Primary Examiner* — Adolf D Berhane
(74) *Attorney, Agent, or Firm* — Buchanan Ingersoll & Rooney PC

(57) ABSTRACT

A series multiplex inverter includes a power conversion unit, a drive signal generation unit, and a drive signal output unit. The drive signal generation unit generates n drive signals that cause different single-phase inverters of n single-phase inverters to output n rectangular wave voltages sequentially out of phase, where n is an integer of three or more. The drive signal output unit outputs the n drive signals to the n single-phase inverters in rotation that shifts, by p every m-fold time of half an output voltage period of the power conversion unit, the single-phase inverters corresponding one-to-one to the n drive signals in a combination of the n drive signals with different single-phase inverters of the n single-phase inverters, where m is a natural number and p is a natural number relatively prime to n or one.

10 Claims, 16 Drawing Sheets

(56) References Cited

FOREIGN PATENT DOCUMENTS

JP      2002058257 A    2/2002
JP      2006320103 A    11/2006
WO      2017073150 A1   5/2017

OTHER PUBLICATIONS

Written Opinion (PCT/ISA/237) dated Mar. 13, 2018, by the Japan Patent Office as the International Searching Authority for International Application No. PCT/JP2018/002805.
Office Action dated Dec. 14, 2020, issued in Indian Patent Application No. 202027029769, 5 pages.

* cited by examiner

FIG.16

| PERIOD | OUTPUT TIMING | | | | | | | |
|---|---|---|---|---|---|---|---|---|
| | $T_1$ | $T_2$ | $T_3$ | $T_4$ | $T_5$ | $T_6$ | $T_7$ | $T_8$ |
| FIRST PERIOD | $V_{INV1}$ | $V_{INV2}$ | $V_{INV3}$ | $V_{INV4}$ | $V_{INV5}$ | $V_{INV6}$ | $V_{INV7}$ | $V_{INV8}$ |
| SECOND PERIOD | $V_{INV4}$ | $V_{INV5}$ | $V_{INV6}$ | $V_{INV7}$ | $V_{INV8}$ | $V_{INV1}$ | $V_{INV2}$ | $V_{INV3}$ |
| THIRD PERIOD | $V_{INV7}$ | $V_{INV8}$ | $V_{INV1}$ | $V_{INV2}$ | $V_{INV3}$ | $V_{INV4}$ | $V_{INV5}$ | $V_{INV6}$ |
| FOURTH PERIOD | $V_{INV2}$ | $V_{INV3}$ | $V_{INV4}$ | $V_{INV5}$ | $V_{INV6}$ | $V_{INV7}$ | $V_{INV8}$ | $V_{INV1}$ |
| FIFTH PERIOD | $V_{INV5}$ | $V_{INV6}$ | $V_{INV7}$ | $V_{INV8}$ | $V_{INV1}$ | $V_{INV2}$ | $V_{INV3}$ | $V_{INV4}$ |
| SIXTH PERIOD | $V_{INV8}$ | $V_{INV1}$ | $V_{INV2}$ | $V_{INV3}$ | $V_{INV4}$ | $V_{INV5}$ | $V_{INV6}$ | $V_{INV7}$ |
| SEVENTH PERIOD | $V_{INV3}$ | $V_{INV4}$ | $V_{INV5}$ | $V_{INV6}$ | $V_{INV7}$ | $V_{INV8}$ | $V_{INV1}$ | $V_{INV2}$ |
| EIGHTH PERIOD | $V_{INV6}$ | $V_{INV7}$ | $V_{INV8}$ | $V_{INV1}$ | $V_{INV2}$ | $V_{INV3}$ | $V_{INV4}$ | $V_{INV5}$ |
| NINTH PERIOD | $V_{INV1}$ | $V_{INV2}$ | $V_{INV3}$ | $V_{INV4}$ | $V_{INV5}$ | $V_{INV6}$ | $V_{INV7}$ | $V_{INV8}$ |
| ⋮ | ⋮ | ⋮ | ⋮ | ⋮ | ⋮ | ⋮ | ⋮ | ⋮ |

FIG.17

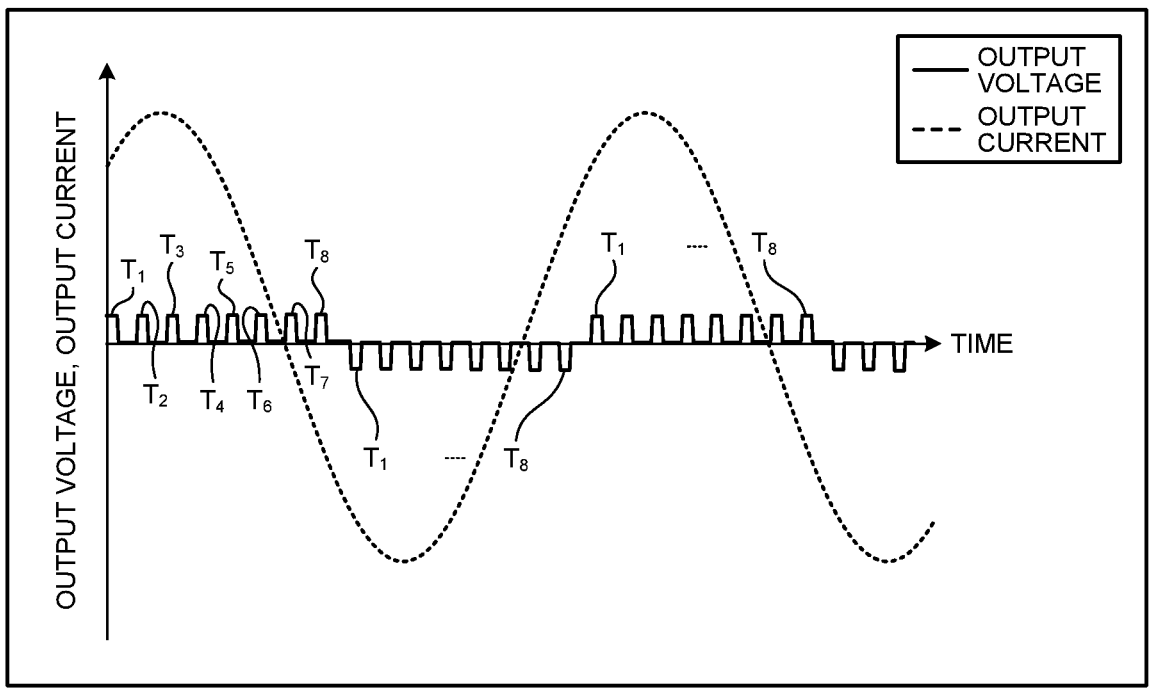

FIG.18

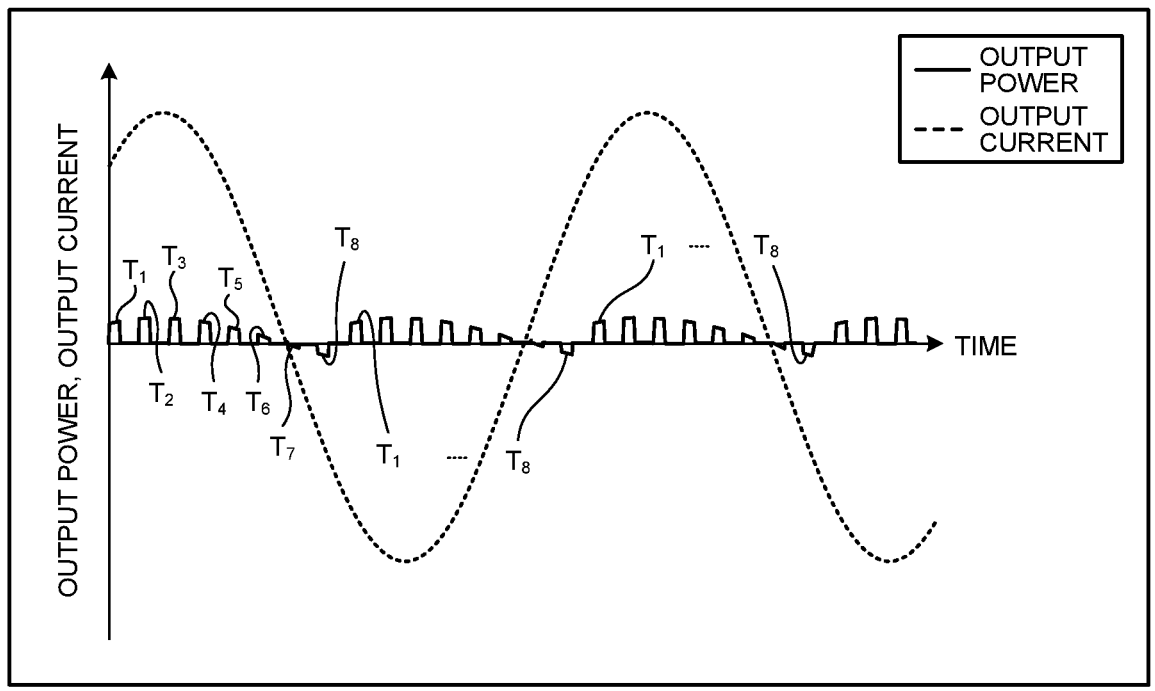

FIG.19

| PERIOD | OUTPUT TIMING | | | | | | | |
|---|---|---|---|---|---|---|---|---|
| | $T_1$ | $T_2$ | $T_3$ | $T_4$ | $T_5$ | $T_6$ | $T_7$ | $T_8$ |
| FIRST PERIOD | $V_{INV1}$ | $V_{INV2}$ | $V_{INV3}$ | $V_{INV4}$ | $V_{INV5}$ | $V_{INV6}$ | $V_{INV7}$ | $V_{INV8}$ |
| SECOND PERIOD | $V_{INV6}$ | $V_{INV7}$ | $V_{INV8}$ | $V_{INV1}$ | $V_{INV2}$ | $V_{INV3}$ | $V_{INV4}$ | $V_{INV5}$ |
| THIRD PERIOD | $V_{INV3}$ | $V_{INV4}$ | $V_{INV5}$ | $V_{INV6}$ | $V_{INV7}$ | $V_{INV8}$ | $V_{INV1}$ | $V_{INV2}$ |
| FOURTH PERIOD | $V_{INV8}$ | $V_{INV1}$ | $V_{INV2}$ | $V_{INV3}$ | $V_{INV4}$ | $V_{INV5}$ | $V_{INV6}$ | $V_{INV7}$ |
| FIFTH PERIOD | $V_{INV5}$ | $V_{INV6}$ | $V_{INV7}$ | $V_{INV8}$ | $V_{INV1}$ | $V_{INV2}$ | $V_{INV3}$ | $V_{INV4}$ |
| SIXTH PERIOD | $V_{INV2}$ | $V_{INV3}$ | $V_{INV4}$ | $V_{INV5}$ | $V_{INV6}$ | $V_{INV7}$ | $V_{INV8}$ | $V_{INV1}$ |
| SEVENTH PERIOD | $V_{INV7}$ | $V_{INV8}$ | $V_{INV1}$ | $V_{INV2}$ | $V_{INV3}$ | $V_{INV4}$ | $V_{INV5}$ | $V_{INV6}$ |
| EIGHTH PERIOD | $V_{INV4}$ | $V_{INV5}$ | $V_{INV6}$ | $V_{INV7}$ | $V_{INV8}$ | $V_{INV1}$ | $V_{INV2}$ | $V_{INV3}$ |
| NINTH PERIOD | $V_{INV1}$ | $V_{INV2}$ | $V_{INV3}$ | $V_{INV4}$ | $V_{INV5}$ | $V_{INV6}$ | $V_{INV7}$ | $V_{INV8}$ |
| ⋮ | ⋮ | ⋮ | ⋮ | ⋮ | ⋮ | ⋮ | ⋮ | ⋮ |

SERIES MULTIPLEX INVERTER

FIELD

The present invention relates to a series multiplex inverter including a plurality of single-phase inverters having output terminals connected in series.

BACKGROUND

Conventionally known series multiplex inverters cause a plurality of single-phase inverters to output rectangular wave voltages out of phase with each other, combine the rectangular wave voltages, and output the combined voltage. Regarding this type of series multiplex inverter, Patent Literature 1 discloses a technique of exchanging, among a plurality of single-phase inverters, timings at which a plurality of pulse width modulation (PWM) signals corresponding one-to-one to the single-phase inverters changes. As a result, the length of time during which a rectangular wave voltage is output from each single-phase inverter is equalized.

CITATION LIST

Patent Literature

Patent Literature 1: Japanese Patent Application Laid-open No. 2006-320103

SUMMARY

Technical Problem

For the above-described conventional series multiplex inverter, the length of time during which a rectangular wave voltage is output can be equalized among the single-phase inverters. However, because the output power from each single-phase inverter is determined as the product of the instantaneous output voltage and the instantaneous output current from each single-phase inverter, the above-described conventional series multiplex inverter poses the problem of large variations in output power among the single-phase inverters.

The present invention has been made in view of the above, and an object thereof is to obtain a series multiplex inverter capable of equalizing the output power among single-phase inverters.

Solution to Problem

In order to solve the above-described problems and achieve the object, a series multiplex inverter of the present invention includes a power conversion unit, a drive signal generation unit, and a drive signal output unit. The power conversion unit includes n single-phase inverters, where n is an integer of three or more, and the n single-phase inverters have output terminals connected in series. The drive signal generation unit generates n drive signals that cause different single-phase inverters of the n single-phase inverters to output n rectangular wave voltages sequentially out of phase. The drive signal output unit outputs the n drive signals to the n single-phase inverters in rotation that shifts, by p every m-fold time of half an output voltage period of the power conversion unit, the single-phase inverters corresponding one-to-one to the n drive signals in a combination of the n drive signals with different single-phase inverters of the n single-phase inverters, where m is a natural number and p is a natural number relatively prime to n or one.

Advantageous Effects of Invention

The present invention can achieve the effect of equalizing the output power between single-phase inverters.

BRIEF DESCRIPTION OF DRAWINGS

FIG. 16 is a diagram illustrating an example of the output timing at which each single-phase inverter outputs a rectangular wave voltage on an update-period-by-update-period basis.

FIG. 17 is a diagram illustrating an example of the relationship between output voltage, output current, and output timings for the case of a lead phase in the series multiplex inverter according to the first embodiment.

FIG. 18 is a diagram illustrating an example of the relationship between output power, output current, and output timings for the case of a lead phase in the series multiplex inverter according to the first embodiment.

FIG. 19 is a diagram illustrating another example of the output timing at which each single-phase inverter outputs a rectangular wave voltage on an update-period-by-update-period basis.

DESCRIPTION OF EMBODIMENTS

Hereinafter, series multiplex inverters according to embodiments of the present invention will be described in detail based on the drawings. The present invention is not limited to the embodiments.

First Embodiment

Figure 1:
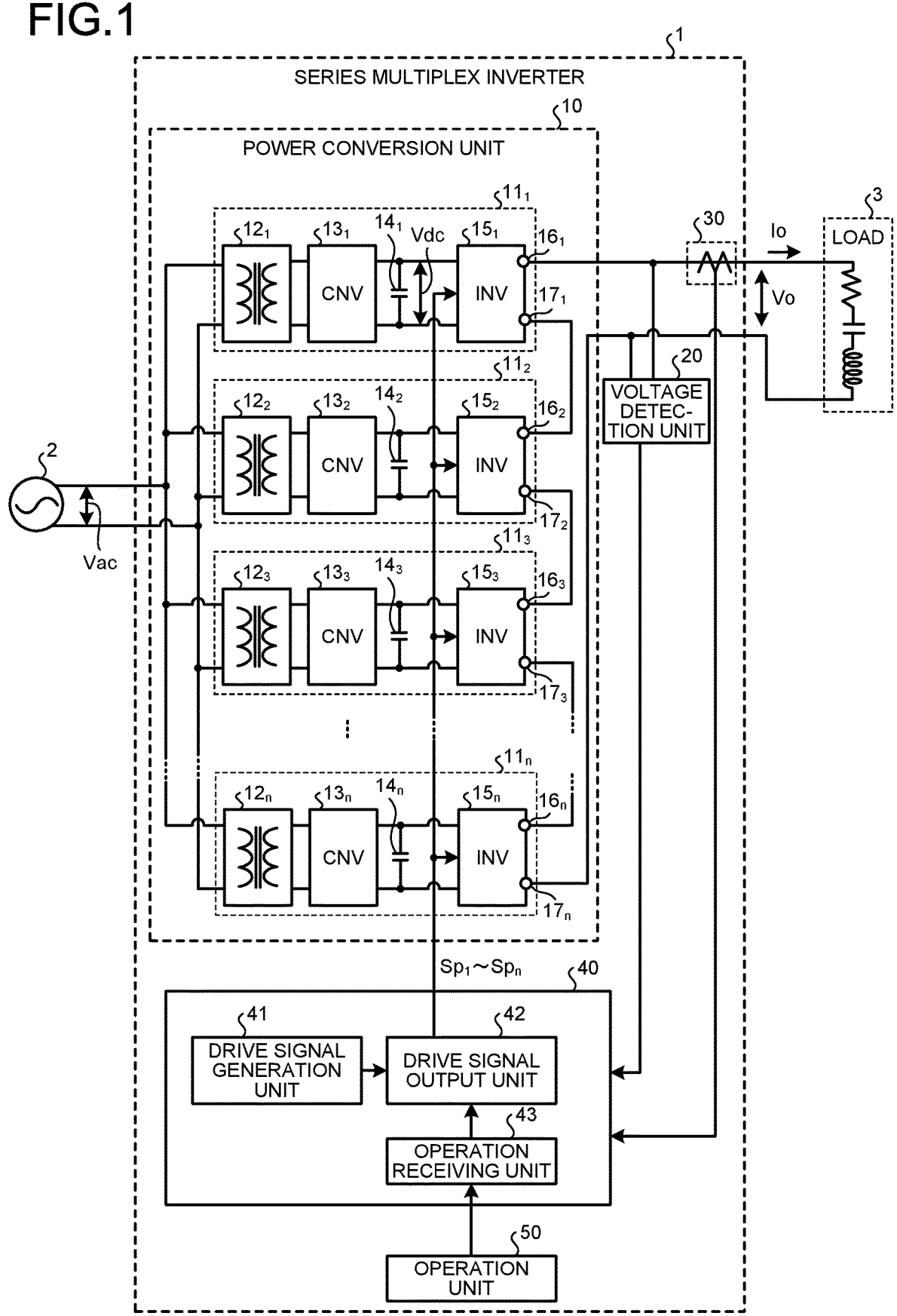
FIG. 1 is a diagram illustrating an exemplary configuration of a series multiplex inverter according to a first embodiment of the present invention.

FIG. 1 is a diagram illustrating an exemplary configuration of a series multiplex inverter according to the first embodiment of the present invention. As illustrated in FIG. 1, the series multiplex inverter 1 according to the first embodiment includes a power conversion unit 10, a voltage detection unit 20, a current detection unit 30, a control unit 40, and an operation unit 50. The control unit 40 controls the power conversion unit 10 such that the output voltage Vo is output from the power conversion unit 10.

The power conversion unit 10 can convert AC power output from a single-phase AC power supply 2 into AC power having some frequency and amplitude. For example, the power conversion unit 10 can convert AC power output from the single-phase AC power supply 2 into high-frequency AC power of 1 kHz or more. Note that the power conversion unit 10 can also convert AC power output from the single-phase AC power supply 2 into AC power having a frequency of less than 1 kHz.

The power conversion unit 10 includes n power conversion blocks $11_1$ to $11_n$. Here, "n" is an integer of three or more. The power conversion block $11_1$ includes a transformer $12_1$, a rectifier circuit $13_1$, a capacitor $14_1$, and a single-phase inverter $15_1$. The power conversion block $11_2$ includes a transformer $12_2$, a rectifier circuit $13_2$, a capacitor $14_2$, and a single-phase inverter $15_2$.

Similarly to the power conversion blocks $11_1$ and $11_2$, each of the power conversion blocks $11_3$ to $11_n$ includes one of transformers $12_3$ to $12_n$, one of rectifier circuits $13_3$ to $13_n$, one of capacitors $14_3$ to $14_n$, and one of single-phase inverters $15_3$ to $15_n$. The power conversion blocks $11_1$ to $11_n$ have the same configuration, as stated above. Hereinafter, therefore, the configuration of the power conversion block $11_1$ will be described in detail.

The primary winding of the transformer $12_1$ is connected to the single-phase AC power supply 2. The transformer $12_1$ converts the AC voltage Vac output from the single-phase AC power supply 2 into an AC voltage having an amplitude that depends on the winding ratio of the transformer $12_1$, and outputs the AC voltage.

The rectifier circuit $13_1$ is connected to the secondary winding of the transformer $12_1$, and rectifies the AC voltage output from the transformer $12_1$. The rectifier circuit $13_1$ is, for example, a full-wave rectifier circuit, a half-wave rectifier circuit, or a full-bridge circuit. Note that the rectifier circuit $13_1$ only needs to be able to rectify the AC voltage output from the transformer $12_1$, and is not necessarily a full-wave rectifier circuit, a half-wave rectifier circuit, or a full-bridge circuit.

The capacitor $14_1$ smooths the output voltage from the rectifier circuit $13_1$. The rectifier circuit $13_1$ and the capacitor $14_1$ convert the AC voltage output from the transformer $12_1$ into the DC voltage Vdc.

The single-phase inverter $15_1$ is controlled by the control unit 40, such that the single-phase inverter $15_1$ can convert the DC voltage Vdc generated by the rectifier circuit $13_1$ and the capacitor $14_1$ into a rectangular wave voltage and output the rectangular wave voltage.

The power conversion blocks $11_2$ to $11_n$ generate and output rectangular wave voltages, similarly to the power conversion block $11_1$. Hereinafter, the voltages output from the single-phase inverters $15_1$ to $15_n$ will be respectively referred to as the output voltages $V_{INV1}$ to $V_{INVn}$ for easy understanding. Note that the output voltages $V_{INV1}$ to $V_{INVn}$ may be collectively referred to as the output voltage $V_{INV}$.

Output terminals $16_1$, $17_1$, $16_2$, $17_2$, ..., $16_{n-1}$, $17_{n-1}$, $16_n$, and $17_n$ of the single-phase inverters $15_1$ to $15_n$ are connected in series. Consequently, the output voltages $V_{INV1}$ to $V_{INVn}$ from the single-phase inverters $15_1$ to $15_n$ are combined, and a result of the combination is output as the output voltage Vo from the power conversion unit 10.

The output voltage Vo from the power conversion unit 10 is supplied to a load 3. In the series multiplex inverter 1 illustrated in FIG. 1, the output voltage Vo from the power conversion unit 10 is directly supplied to the load 3. Alternatively, the series multiplex inverter 1 may include a harmonic filter or harmonic transformer (not illustrated) between the power conversion unit 10 and the load 3. The harmonic filter is, for example, an LC filter.

Hereinafter, the transformers $12_1$ to $12_n$ may be collectively referred to as the transformer 12, and the rectifier circuits $13_1$ to $13_n$ may be collectively referred to as the rectifier circuit 13. The capacitors $14_1$ to $14_n$ may be collectively referred to as the capacitor 14, and the single-phase inverters $15_1$ to $15_n$ may be collectively referred to as the single-phase inverter 15.

In the exemplary configuration illustrated in FIG. 1, each of the power conversion blocks $11_1$ to $11_n$ includes the transformer 12, the rectifier circuit 13, and the capacitor 14. Alternatively, a DC power supply that outputs the DC voltage Vdc may be provided instead of the transformer 12, the rectifier circuit 13, and the capacitor 14.

Figure 2:
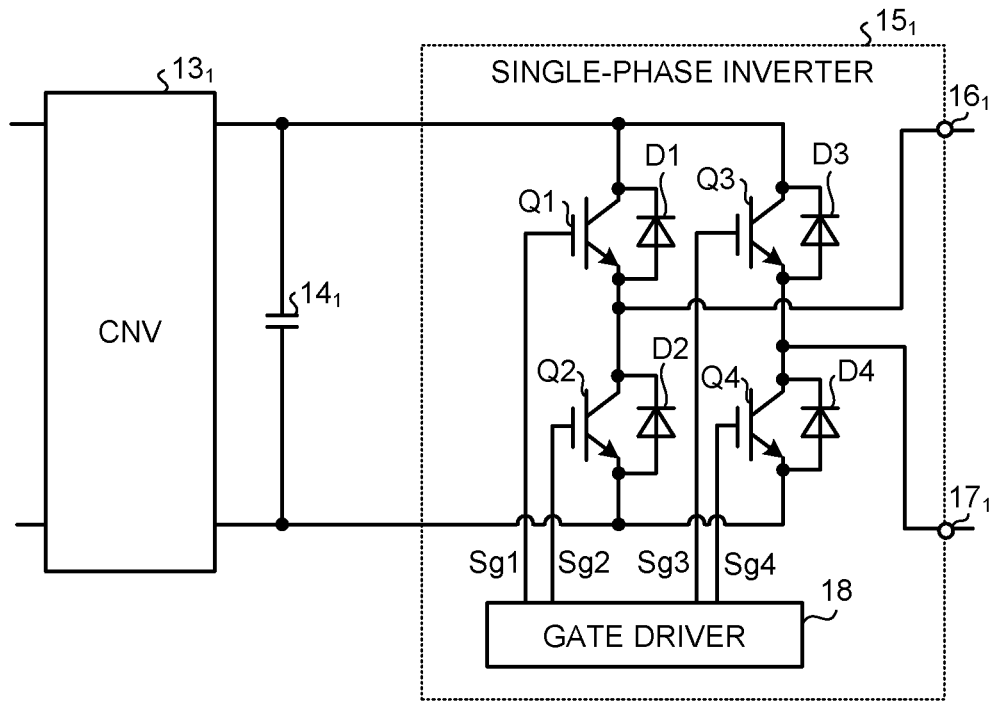
FIG. 2 is a diagram illustrating an exemplary configuration of a single-phase inverter according to the first embodiment.

FIG. 2 is a diagram illustrating an exemplary configuration of a single-phase inverter according to the first embodiment. As illustrated in FIG. 2, the single-phase inverter $15_1$ includes four switching elements Q1 to Q4 connected in full bridge configuration, diodes D1 to D4 connected in antiparallel to the switching elements Q1 to Q4, respectively, and a gate driver 18.

The gate driver 18 generates gate signals Sg1 to Sg4 on the basis of a drive signal (described later) output from the control unit 40, and outputs each of the generated gate signals Sg1 to Sg4 to the corresponding one of the gates of the switching elements Q1 to Q4. Consequently, the switching elements Q1 to Q4 are subjected to on/off control, such that the output voltage $V_{INV1}$ is generated and output by the single-phase inverter $15_1$. The switching elements Q1 to Q4 are semiconductor switching elements represented by metal-oxide-semiconductor field-effect transistors (MOSFETs) and insulated gate bipolar transistors (IGBTs).

Figure 3:
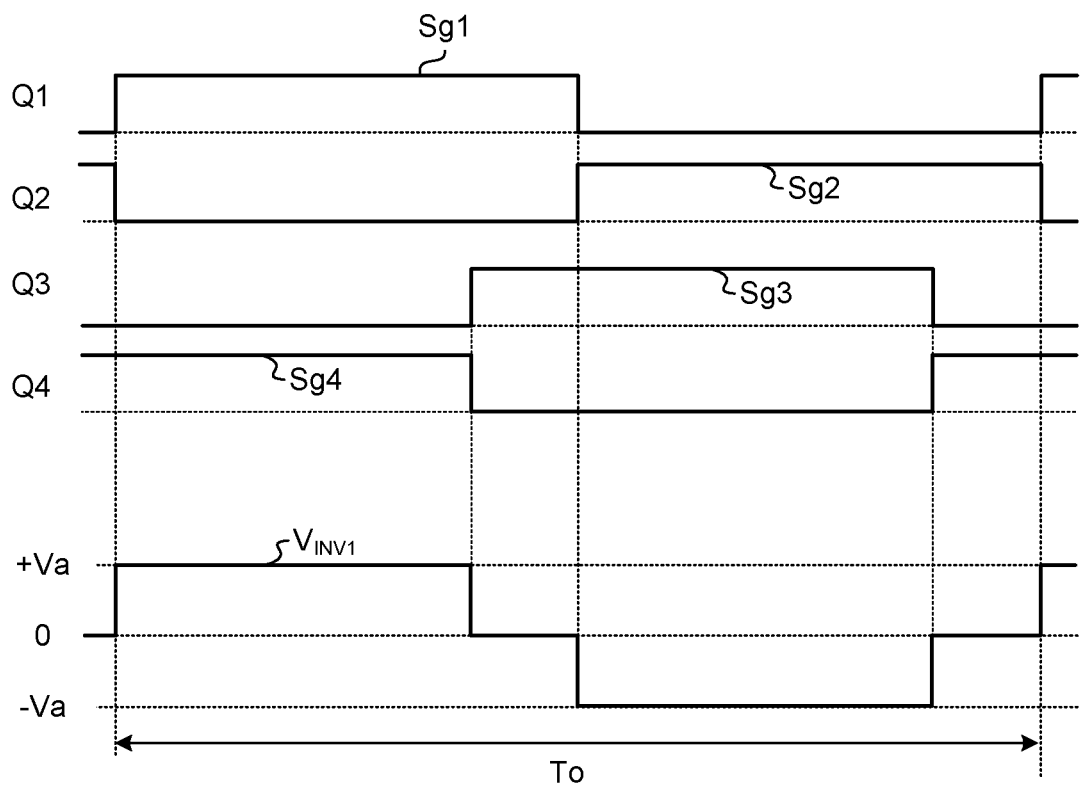
FIG. 3 is a diagram illustrating the relationship between gate signals output from a gate driver and the waveform of the output voltage from a single-phase inverter according to the first embodiment.

FIG. 3 is a diagram illustrating the relationship between gate signals output from a gate driver and the waveform of the output voltage from a single-phase inverter according to the first embodiment. As illustrated in FIG. 3, the output voltage $V_{INV1}$ including a rectangular wave voltage is generated by the gate signals Sg1 to Sg4. In FIG. 3, "To" is an output voltage period indicating the fundamental period of the output voltage Vo from the series multiplex inverter 1. In addition, "+Va" is the voltage value of a positive rectangular wave voltage output from the single-phase inverter $15_1$, and "−Va" is the voltage value of a negative rectangular wave voltage output from the single-phase inverter $15_1$.

A drive signal output from the control unit 40 to the single-phase inverter 15 includes four pulse width modulation signals having the same waveform as the respective gate signals Sg1 to Sg4, and is amplified by the gate driver 18 and output to the switching elements Q1 to Q4. Note that this is a non-limiting example of a drive signal, and any drive signal can be used as long as the gate driver 18 can generate the gate signals Sg1 to Sg4 on the basis of the drive signal from the control unit 40. For example, a drive signal output from the control unit 40 to each single-phase inverter 15 may include one or two PWM signals. That is, the gate driver 18 may be configured to generate and output the gate signals Sg1 to Sg4 from a drive signal including one or two PWM signals.

The single-phase inverters $15_2$ to $15_n$ have the same configuration as the single-phase inverter $15_1$. Note that the single-phase inverters $15_1$ to $15_n$ are not limited to the configuration illustrated in FIG. 2. That is, the single-phase inverters $15_1$ to $15_n$ only need to be able to output the output voltages $V_{INV1}$ to $V_{INVn}$ (described later), and do not necessarily have the configuration illustrated in FIG. 2.

Reference is made back to FIG. 1 to continue the explanation of the series multiplex inverter 1. The voltage detection unit 20 of the series multiplex inverter 1 repeatedly detects the instantaneous value of the output voltage Vo from the power conversion unit 10, and outputs the detected voltage value Vdet that is the detected instantaneous value of the output voltage Vo. The current detection unit 30 of the series multiplex inverter 1 repeatedly detects the instantaneous value of the output current Io from the power conversion unit 10, and outputs the detected current value Idet that is the detected instantaneous value of the output current Io.

The control unit 40 of the series multiplex inverter 1 includes a drive signal generation unit 41, a drive signal output unit 42, and an operation receiving unit 43. The drive signal output unit 42 generates n drive signals $Sp_1$ to $Sp_n$. The drive signal output unit 42 outputs the n drive signals $Sp_1$ to $Sp_n$ to the n single-phase inverters $15_1$ to $15_n$. Hereinafter, the drive signals $Sp_1$ to $Sp_n$ may be collectively referred to as the drive signal Sp.

The drive signal generation unit 41 generates the n drive signals Sp by constant output current control on the basis of the detected current value Idet. Each drive signal Sp includes, for example, a plurality of PWM signals as described above. Note that the drive signal generation unit 41 can also generate the n drive signals Sp by constant output voltage control or constant output power control. For example, the drive signal generation unit 41 can generate the n drive signals Sp by constant output voltage control on the basis of the detected voltage value Vdet.

The drive signal generation unit 41 can generate the n drive signals Sp by constant output power control on the basis of the detected voltage value Vdet and the detected current value Idet. In a case where the drive signal generation unit 41 performs only constant output current control, the voltage detection unit 20 may not be provided.

The drive signals $Sp_1$ to $Sp_n$ are signals that cause different single-phase inverters of the n single-phase inverters 15 to output n rectangular wave voltages sequentially out of phase by the first phase difference φ1 (described later). Hereinafter, an exemplary configuration of the drive signal generation unit 41 will be described.

Figure 4:
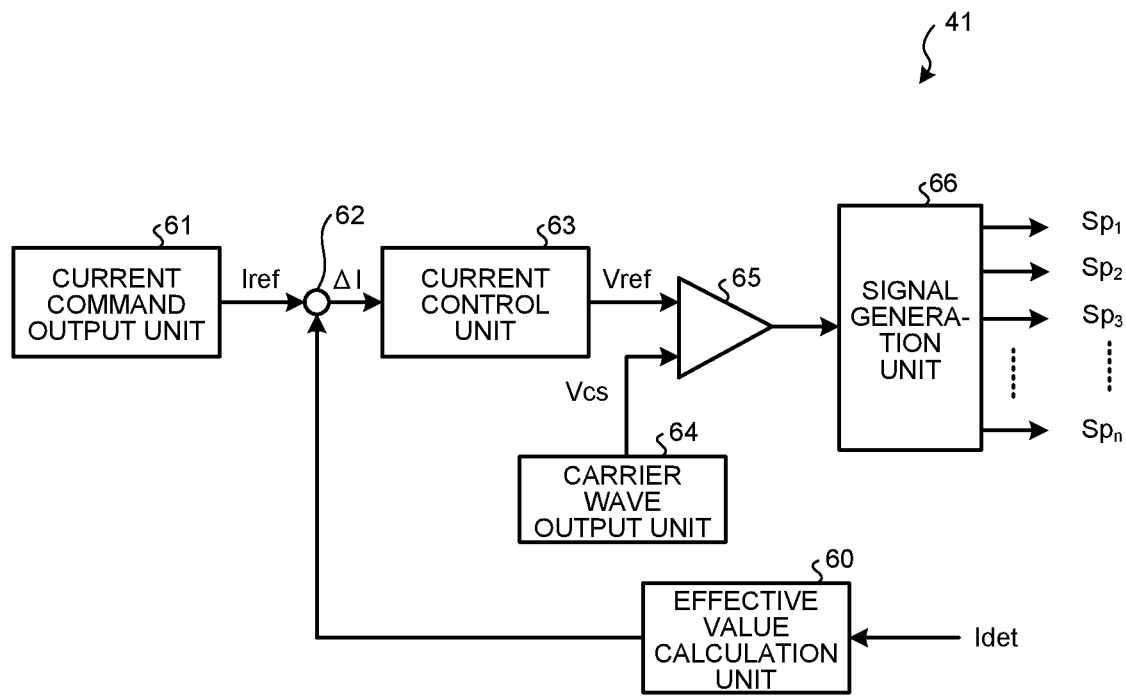
FIG. 4 is a diagram illustrating an exemplary configuration of a drive signal generation unit according to the first embodiment.

FIG. 4 is a diagram illustrating an exemplary configuration of the drive signal generation unit according to the first embodiment. As illustrated in FIG. 4, the drive signal generation unit 41 includes an effective value calculation unit 60, a current command output unit 61, a subtractor 62, a current control unit 63, a carrier wave output unit 64, a comparator 65, and a signal generation unit 66.

The effective value calculation unit 60 calculates the output current effective value Iom, which is the effective value of the output current Io, on the basis of the detected current value Idet output from the current detection unit 30. The effective value calculation unit 60 calculates the output current effective value Iom, for example, every half output voltage period To. The output voltage period To is the fundamental period of the output voltage Vo as described above, and To=1/fo is satisfied. Note that "fo" is the frequency of the output voltage Vo, and is hereinafter referred to as the output voltage frequency fo.

The current command output unit 61 outputs the current command Iref. The value of the current command Iref is generated by the current command output unit 61 on the basis of, for example, information supplied from the outside to the current command output unit 61.

The subtractor 62 subtracts the output current effective value Iom from the current command Iref, and outputs the current difference value ΔI as the result of the subtraction. The current control unit 63 generates the voltage command Vref on the basis of the current difference value ΔI output from the subtractor 62. The current control unit 63 can generate the voltage command Vref by, for example, proportional integral control or proportional integral derivative control.

The carrier wave output unit 64 generates the carrier wave Vcs and outputs the generated carrier wave Vcs. The carrier wave Vcs is, for example, a voltage having a triangular waveform or a voltage having a sawtooth waveform. The output voltage period To is the same as the period of the carrier wave Vcs. When the period of the carrier wave Vcs changes, the output voltage period To changes.

The comparator 65 compares the voltage command Vref with the carrier wave Vcs, and outputs the result of the comparison. Specifically, the comparator 65 outputs the first voltage V1 when the voltage command Vref is larger than the carrier wave Vcs, and outputs the second voltage V2 different from the first voltage V1 when the voltage command Vref is smaller than the carrier wave Vcs.

The signal generation unit 66 generates the n drive signals $Sp_1$ to $Sp_n$ on the basis of the voltage output from the comparator 65. The signal generation unit 66 has information indicating the first phase difference φ1. The signal generation unit 66 also determines the second phase difference φ2 on the basis of the duty ratio of the voltage output from the comparator 65. For example, the signal generation unit 66 determines the second phase difference φ2 such that the shorter the time during which the second voltage V2 is output from the comparator 65 is, the smaller the second phase difference φ2 is, in half period of the carrier wave Vcs.

The signal generation unit 66 generates the n drive signals $Sp_1$ to $Sp_n$ on the basis of the first phase difference φ1 and the second phase difference φ2. The signal generation unit 66 outputs the generated n drive signals $Sp_1$ to $Sp_n$ to the drive signal output unit 42 illustrated in FIG. 1.

The drive signal output unit 42 determines a pattern of a combination of the drive signals $Sp_1$ to $Sp_n$ with the single-phase inverters $15_1$ to $15_n$ at each update period Ts set in advance. The drive signal output unit 42 outputs the drive signals $Sp_1$ to $Sp_n$ to the single-phase inverters $15_1$ to $15_n$ in accordance with the determined pattern of the combination of the drive signals $Sp_1$ to $Sp_n$ with the single-phase inverters $15_1$ to $15_n$. Note that Ts=To/2×m is satisfied, where m is a natural number.

The single-phase inverters $15_1$ to $15_n$ output the output voltages $V_{INV1}$ to $V_{INVn}$ from the output terminals $16_1$, $17_1$, $16_2$, $17_2$, ..., $16_{n-1}$, $17_{n-1}$, $16_n$, and $17_n$ on the basis of the drive signals $Sp_1$ to $Sp_n$ output from the drive signal output unit 42. The output voltages $V_{INV1}$ to $V_{INVn}$ from the single-phase inverters $15_1$ to $15_n$ are combined, and the result of the combination is output as the output voltage Vo from the power conversion unit 10.

Figure 5:
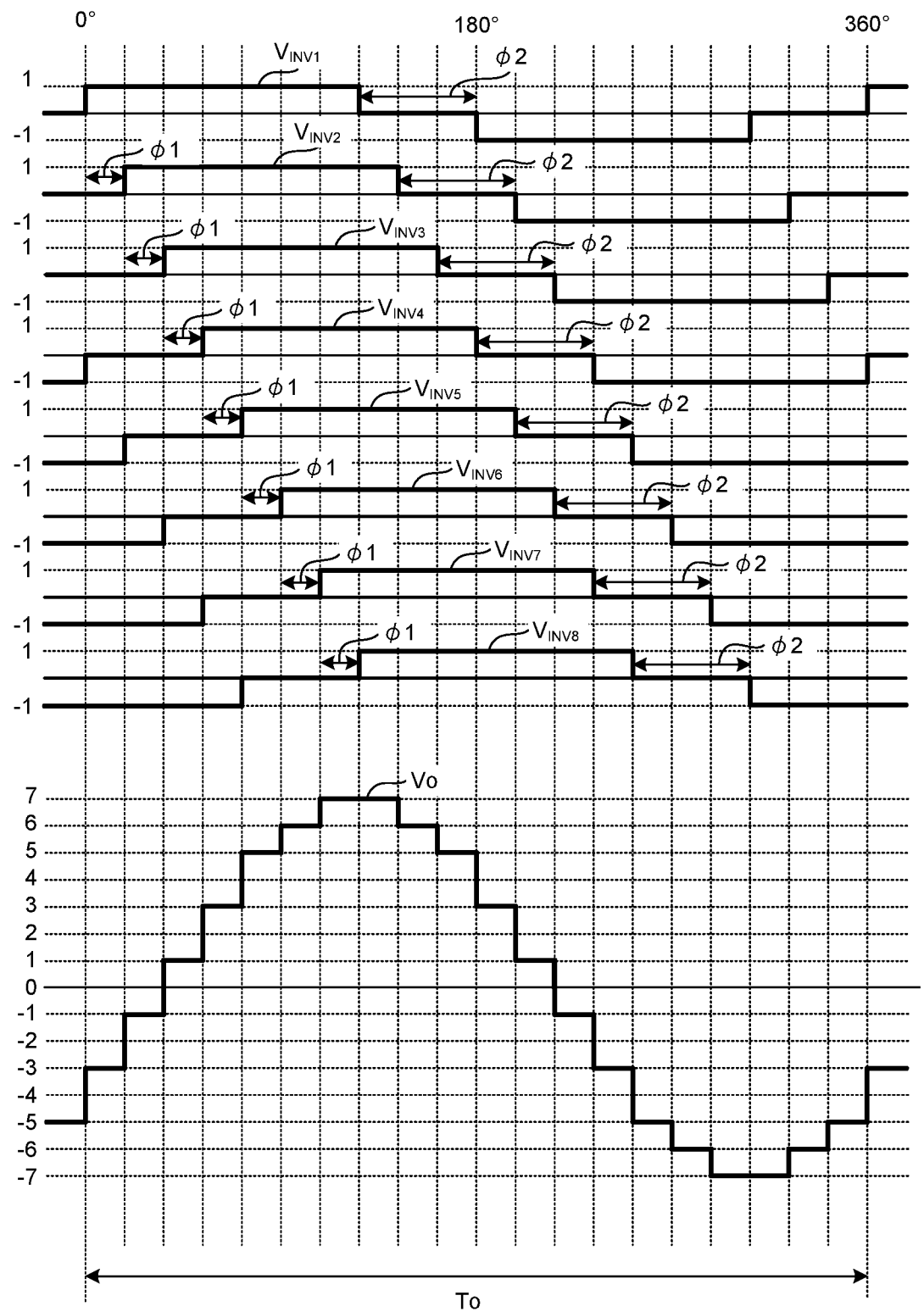
FIG. 5 is a diagram illustrating an example of output voltages from a plurality of single-phase inverters according to the first embodiment.
Figure 6:
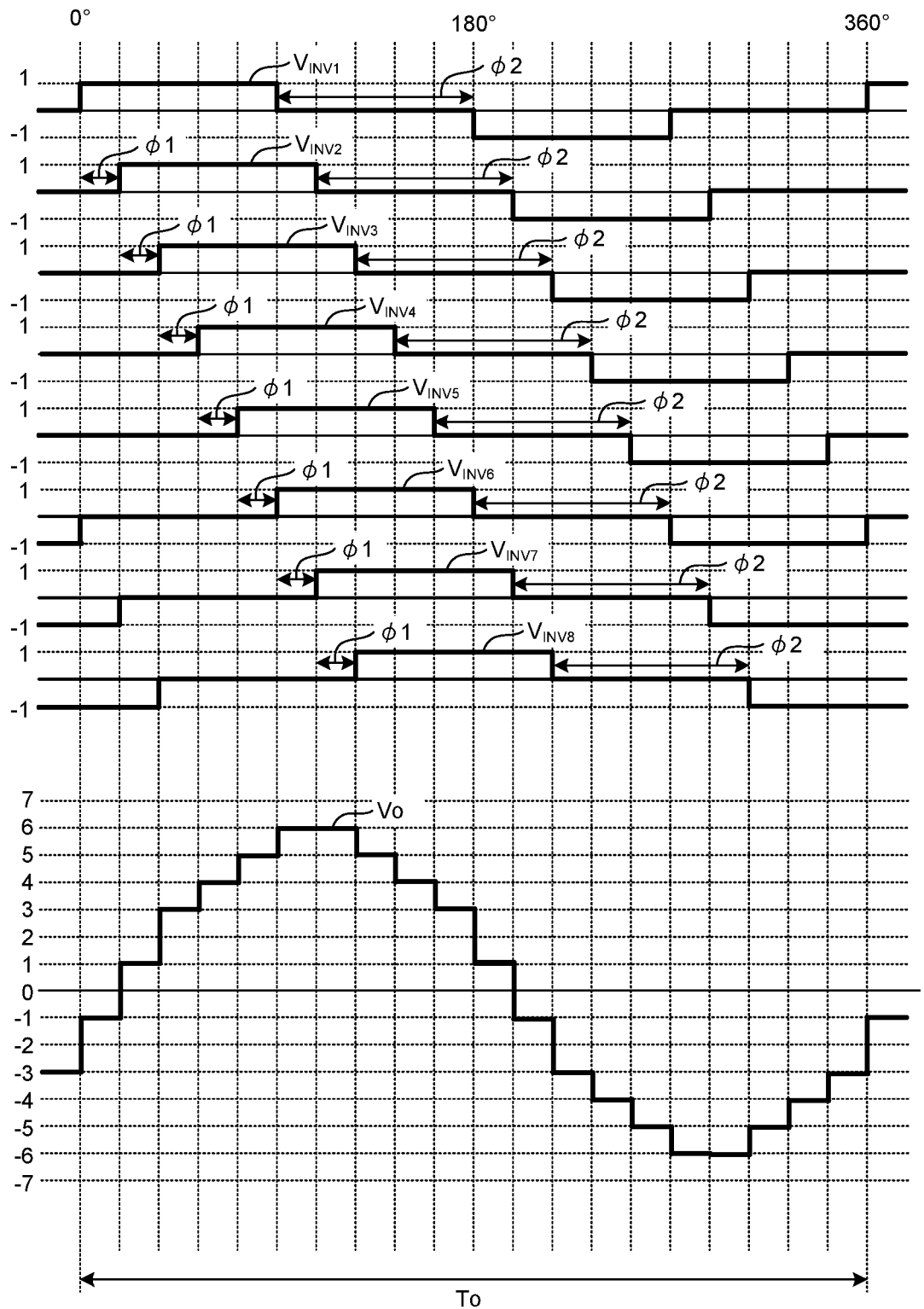
FIG. 6 is a diagram illustrating an example of output voltages from a plurality of single-phase inverters according to the first embodiment.
Figure 7:
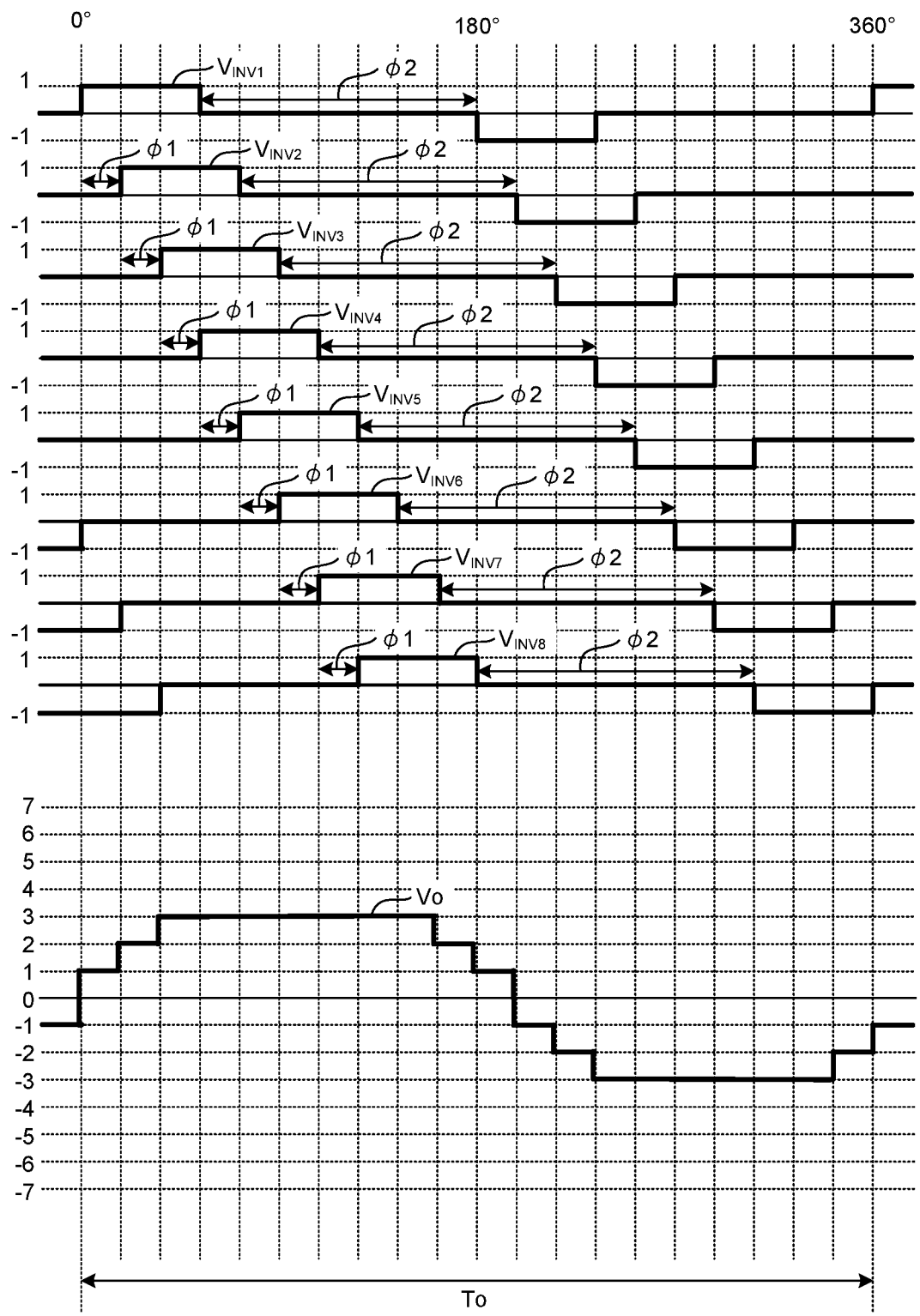
FIG. 7 is a diagram illustrating an example of output voltages from a plurality of single-phase inverters according to the first embodiment.

Here, the output voltages $V_{INV1}$ to $V_{INVn}$ from the single-phase inverters $15_1$ to $15_n$ will be described in detail with reference to FIGS. 5 to 7. FIGS. 5 to 7 are diagrams illustrating examples of output voltages from a plurality of single-phase inverters according to the first embodiment. In the examples of FIGS. 5 to 7, n=8 is satisfied, that is, the number of single-phase inverters 15 is eight, and the drive signals $Sp_1$ to $Sp_8$ are sequentially input in a one-to-one correspondence to the single-phase inverters $15_1$ to $15_8$ in order of $Sp_1$ to $Sp_8$.

Specifically, the drive signal $Sp_1$ is input to the single-phase inverter $15_1$, the drive signal $Sp_2$ is input to the single-phase inverter $15_2$, the drive signal $Sp_3$ is input to the single-phase inverter $15_3$, and the drive signal $Sp_4$ is input to the single-phase inverter $15_4$. Similarly, the drive signal $Sp_5$ is input to the single-phase inverter $15_5$, the drive signal $Sp_6$ is input to the single-phase inverter $15_6$, the drive signal $Sp_7$ is input to the single-phase inverter $15_7$, and the drive signal $Sp_8$ is input to the single-phase inverter $15_8$.

In FIGS. 5 to 7, "1" means the above-mentioned "+Va" which is the voltage value of a positive rectangular wave voltage output from the single-phase inverter 15, and "−1" means the above-mentioned "−Va" which is the voltage value of a negative rectangular wave voltage output from the single-phase inverter 15. Also, "2" to "7" mean multiples of "+Va", and "−2" to "−7" mean multiples of "−Va". In FIGS. 5 to 7, the vertical axis represents the instantaneous value of the output voltage Vo, and the horizontal axis represents the phase of the output voltage Vo. The interval between vertical dashed lines is 18°. Hereinafter, the phase of the output voltage Vo is referred to as the output voltage phase θo.

As illustrated in FIG. 5, the output voltages $V_{INV1}$ to $V_{INV8}$ are sequentially out of phase by the first phase difference φ1. Specifically, the output voltages $V_{INV1}$ to $V_{INV8}$ become positive rectangular wave voltages at timings sequentially out of phase by the first phase difference φ1, and become negative rectangular wave voltages at timings sequentially out of phase by the first phase difference φ1. In the example illustrated in FIG. 5, φ1=18° is satisfied.

For example, the positive rectangular wave voltage at the output voltage $V_{INV2}$ is out of phase with the positive rectangular wave voltage at the output voltage $V_{INV1}$ by the first phase difference φ1. The positive rectangular wave voltage at the output voltage $V_{INV3}$ is out of phase with the positive rectangular wave voltage at the output voltage $V_{INV2}$ by the first phase difference φ1. Similarly, the negative rectangular wave voltage at the output voltage $V_{INV2}$ is out of phase with the negative rectangular wave voltage at the output voltage $V_{INV1}$ by the first phase difference φ1. The negative rectangular wave voltage at the output voltage $V_{INV3}$ is out of phase with the negative rectangular wave voltage at the output voltage $V_{INV2}$ by the first phase difference φ1.

The single-phase inverter 15 also outputs, on the basis of the drive signal Sp, a negative rectangular wave voltage shifted by the second phase difference φ2 from the end of the output of the positive rectangular wave voltage. In the example illustrated in FIG. 5, φ2=54° is satisfied. For the output voltage $V_{INV1}$ from the single-phase inverter $15_1$, the time period of 0°≤θo<126° is a time period during which a positive rectangular wave voltage is output, and the time period of 180°≤θo<306° is a time period during which a negative rectangular wave voltage is output. Therefore, for the output voltage $V_{INV1}$, the time period of the negative rectangular wave voltage starts at the timing shifted by 54°, which is the second phase difference φ2, from the end of the time period of the positive rectangular wave voltage.

Similarly, for the output voltages $V_{INV2}$ to $V_{INV8}$ from the single-phase inverters $15_2$ to $15_8$, the time period of the negative rectangular wave voltage starts at the timing shifted by the second phase difference φ2 from the end of the time period of the positive rectangular wave voltage. As is clear from the foregoing, the drive signal Sp is generated such that the output voltage $V_{INV}$ from the single-phase inverter 15 involves the second phase difference φ2.

As described above, because the output terminals $16_1$, $17_1$, $16_2$, $17_2$, ..., $16_{n-1}$, $17_{n-1}$, $16_n$, and $17_n$ of the single-phase inverters $15_1$ to $15_8$ are connected in series, the output voltages $V_{INV1}$ to $V_{INV8}$ from the single-phase inverters $15_1$ to $15_8$ are combined. Therefore, as illustrated in FIG. 5, the waveform of the output voltage Vo from the power conversion unit 10 is a composite waveform of the output voltages $V_{INV1}$ to $V_{INV8}$.

For example, in the case of 0°≤θo<18°, the output voltage $V_{INV1}$ is +Va, the output voltages $V_{INV2}$ to $V_{INV4}$ are 0 V, and the output voltages $V_{INV5}$ to $V_{INV8}$ are −Va. Therefore, the output voltage Vo is −3×Va. In the case of 18°≤θo<36°, the output voltages $V_{INV1}$ and $V_{INV2}$ are +Va, the output voltages $V_{INV3}$ to $V_{INV5}$ are 0 V, and the output voltages $V_{INV6}$ to $V_{INV8}$ are −Va. Therefore, the output voltage Vo is −Va. In the case of 36°≤θo<54°, the output voltages $V_{INV1}$ to $V_{INV3}$ are +Va, the output voltages $V_{INV4}$ to $V_{INV6}$ are 0 V, and the output voltages $V_{INV7}$ and $V_{INV8}$ are −Va. Therefore, the output voltage Vo is +Va.

Thus, the output voltages $V_{INV1}$ to $V_{INV8}$ from the single-phase inverters $15_1$ to $15_8$ are combined together and output as the output voltage Vo from the power conversion unit 10. In the example illustrated in FIG. 5, the output voltage Vo changes stepwise in the range of 7×Va to −7×Va. Changing the magnitude of the second phase difference φ2 to increase or decrease the time during which the single-phase inverter 15 outputs a rectangular wave voltage controls waveform of the output voltage Vo.

The second phase difference φ2 illustrated in FIG. 6 is set larger than the second phase difference φ2 illustrated in FIG. 5. Specifically, the second phase difference φ2 illustrated in FIG. 6 is larger than the second phase difference φ2 illustrated in FIG. 5 by the time equivalent to 36°. Therefore, in the example illustrated in FIG. 6, the output voltage Vo changes stepwise in the range of 6×Va to −6×Va, and has a smaller amplitude than the output voltage Vo illustrated in FIG. 5.

Similarly, the second phase difference φ2 illustrated in FIG. 7 is set larger than the second phase difference φ2 illustrated in FIG. 6. Specifically, the second phase difference φ2 illustrated in FIG. 7 is larger than the second phase difference φ2 illustrated in FIG. 6 by the time equivalent to 36°. Therefore, in the example illustrated in FIG. 7, the output voltage Vo changes stepwise in the range of 3×Va to −3×Va, and has a smaller amplitude than the output voltage Vo illustrated in FIG. 6.

As illustrated in FIGS. 5 to 7, because the output voltages $V_{INV1}$ to $V_{INV8}$ are sequentially out of phase but have the same waveform, the single-phase inverters $15_1$ to $15_8$ output rectangular wave voltages for an equal length of time.

Further, as described above, because the drive signal output unit 42 of the control unit 40 determines the combination pattern of the drive signals $Sp_1$ to $Sp_n$ with the single-phase inverters $15_1$ to $15_n$ at each update period Ts, the output power can be equalized among the single-phase inverters 15. Hereinafter, the reason why the output power can be equalized among the single-phase inverters 15 will be described.

If the combination of the drive signals $Sp_1$ to $Sp_n$ with the single-phase inverters $15_1$ to $15_n$ in one-to-one correspondence is fixed, two phenomena occur as follows. Now, suppose that, as illustrated in FIG. 1, the load 3 which can be represented by a resonance circuit including L, C, and R equivalently is connected to the series multiplex inverter 1. Then, assume that the control unit 40 controls the power conversion unit 10 by constant output current control.

First, the first phenomenon that occurs when the combination of the drive signals $Sp_1$ to $Sp_n$ with the single-phase inverters $15_1$ to $15_n$ is fixed will be described with reference to FIGS. 8 to 10.

Figure 8:
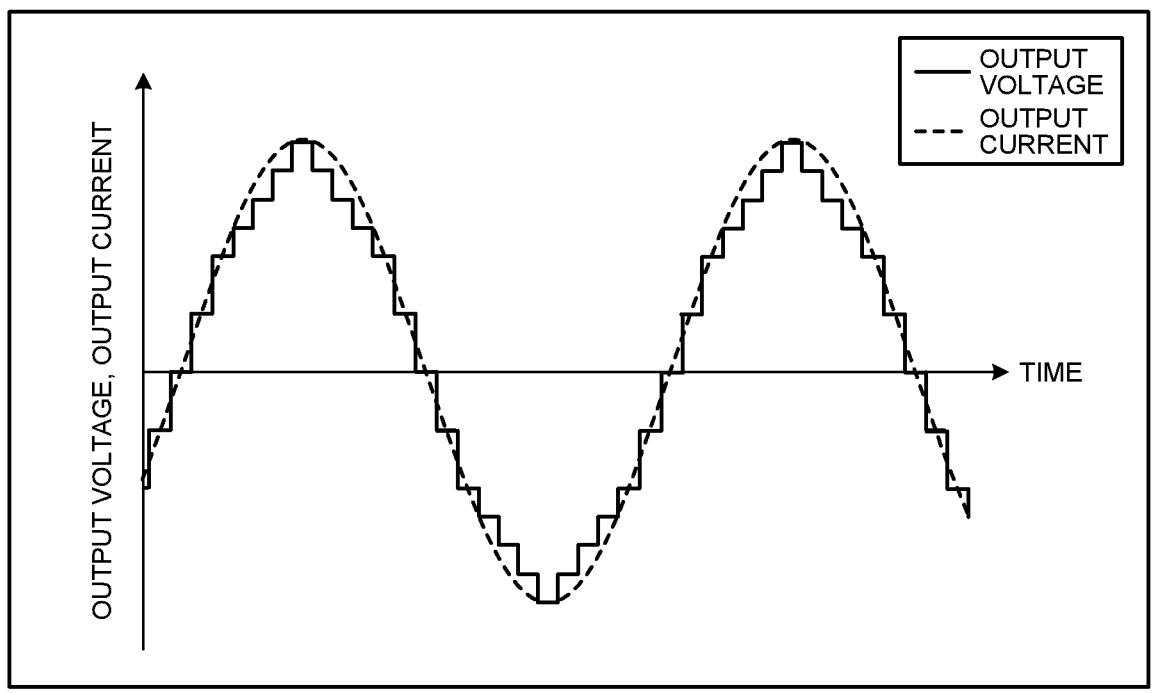
FIG. 8 is a diagram illustrating an example of the waveform of an output voltage and the waveform of an output current from the series multiplex inverter according to the first embodiment.
Figure 9:
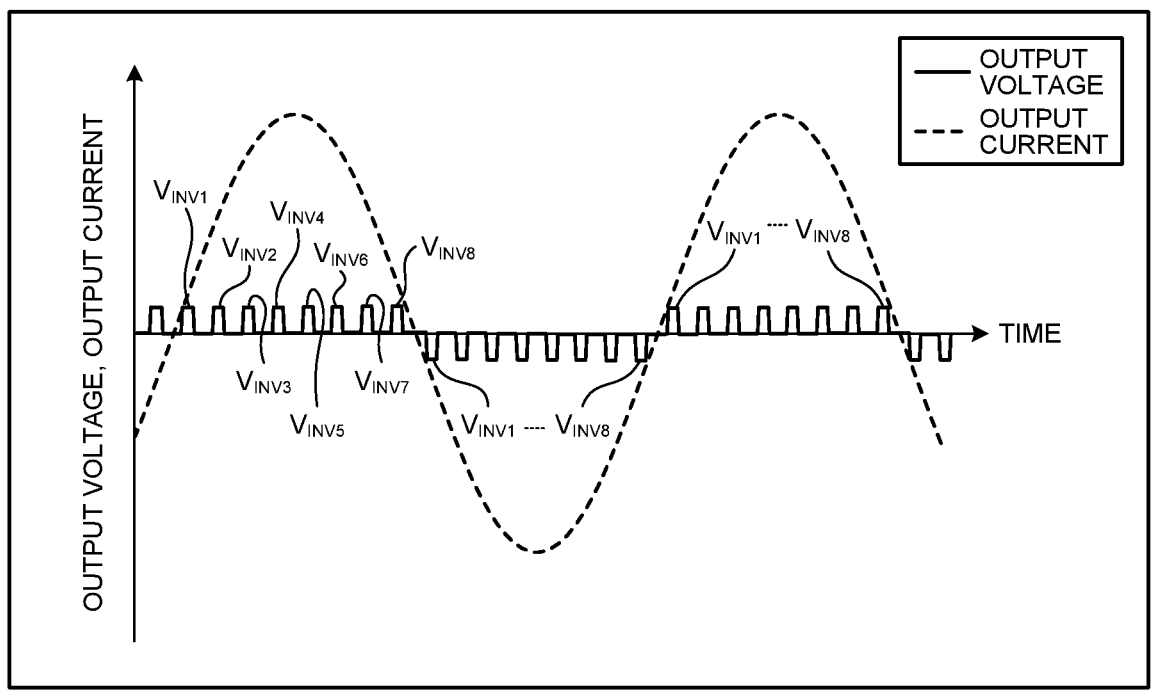
FIG. 9 is a diagram illustrating an example of the waveform of an output voltage and the waveform of an output current from the series multiplex inverter according to the first embodiment.

FIGS. 8 and 9 are diagrams each illustrating an example of the waveform of an output voltage and the waveform of an output current from the series multiplex inverter according to the first embodiment. For the sake of simplicity, examples of the waveform of the output voltage Vo and the waveform of the output current Io illustrated in FIGS. 8 and 9 are based on the assumption that the output voltage frequency fo of the series multiplex inverter 1 matches the resonance frequency of the load 3.

FIG. 8 shows the waveform of the output voltage Vo and the waveform of the output current Io from the series multiplex inverter 1 where the load 3 consumes a lot of power. In the state illustrated in FIG. 8, the rectangular wave voltages output from the respective single-phase inverters 15 overlap each other because the time during which the rectangular wave voltage is output from each single-phase inverter 15 is long. Therefore, as illustrated in FIG. 8, the output voltage Vo has a pseudo sinusoidal waveform.

FIG. 9 shows the waveform of the output voltage Vo and the waveform of the output current Io from the series multiplex inverter 1 where the load 3 consumes almost no power. In the state illustrated in FIG. 9, the rectangular wave voltages output from the respective single-phase inverters 15 do not overlap each other but are independent of each other because the time during which the rectangular wave voltage is output from each single-phase inverter 15 is short.

Figure 10:
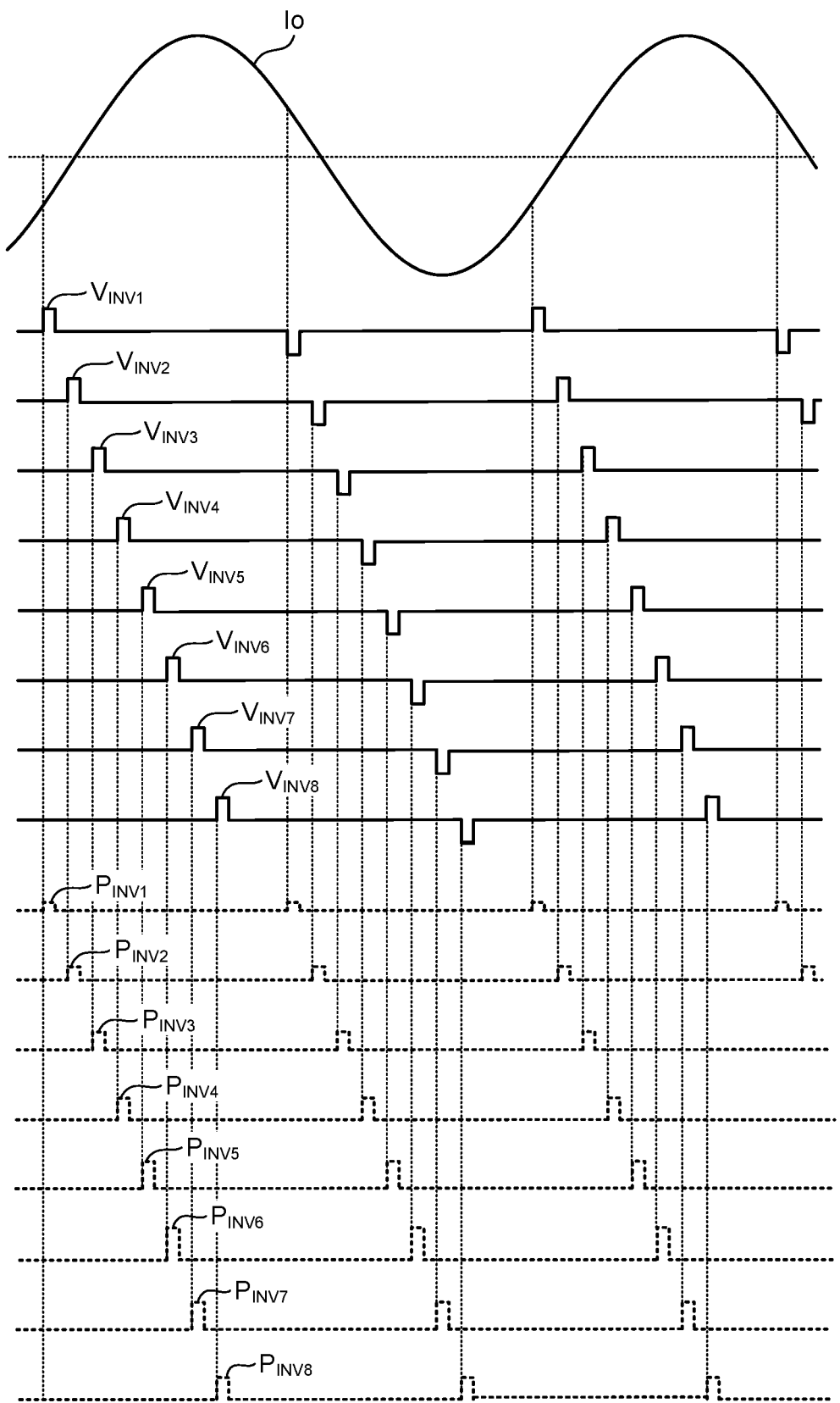
FIG. 10 is a diagram illustrating an example of the waveform of an output voltage and the waveform of an output power from each single-phase inverter in the state illustrated in FIG. 9.

FIG. 10 is a diagram illustrating an example of the waveform of an output voltage and the waveform of an output power from each single-phase inverter in the state illustrated in FIG. 9. In FIG. 10, n=8 is satisfied, and the waveforms of the output voltages $V_{INV1}$ to $V_{INV8}$ and the waveforms of the output powers $P_{INV1}$ to $P_{INV8}$ from the single-phase inverters $15_1$ to $15_8$ are illustrated. Hereinafter, the output powers $P_{INV1}$ to $P_{INV8}$ may be collectively referred to as the output power $P_{INV}$.

Because the output terminals 16 and 17 of the single-phase inverters $15_1$ to $15_8$ are connected in series, the output current Io from the series multiplex inverter 1 and the output current from the single-phase inverters $15_1$ to $15_8$ are the same. Further, as described above, the single-phase inverters $15_1$ to $15_8$ output rectangular wave voltages for the same length of time.

However, the single-phase inverters $15_1$ to $15_8$ output rectangular wave voltages at different timings. The output power $P_{INV}$ from each single-phase inverter 15 is determined as the product of the instantaneous output voltage and the instantaneous output current from each single-phase inverter 15. The single-phase inverters 15 output rectangular wave voltages for the same length of time but at different timings, and each single-phase inverter 15 outputs a rectangular wave voltage at a fixed timing. Therefore, the output powers $P_{INV1}$ to $P_{INV8}$ from the single-phase inverters $15_1$ to $15_n$ are different from one another.

For example, the output power $P_{INV}$ from the single-phase inverter 15 that outputs a rectangular wave voltage at a timing when the instantaneous value of the output current Io is large is large. Conversely, the output power $P_{INV}$ from the single-phase inverter 15 that outputs a rectangular wave voltage at a timing when the instantaneous value of the output current Io is small is small.

Because the output powers $P_{INV}$ from the single-phase inverters 15 differ from one another as discussed above, losses in the single-phase inverters 15 also differ from one another. In order to achieve commonality of cooling design for the single-phase inverters $15_1$ to $15_n$, cooling design for the single-phase inverter 15 with the largest loss should be applied to all the remaining single-phase inverters 15, which leads to an increase in the size and cost of the series multiplex inverter.

Next, the second phenomenon that occurs when the combination of the drive signals $Sp_1$ to $Sp_n$ with the single-phase inverters $15_1$ to $15_n$ is fixed will be described with reference to FIGS. 11 to 13.

The characteristics of the load 3 connected to the series multiplex inverter 1 change due to temperature, humidity, aging deterioration, and the like, and a difference may occur between the output voltage frequency fo of the series multiplex inverter 1 and the resonance frequency of the load 3. In this case, a phase shift occurs between the output voltage Vo and the output current Io from the series multiplex inverter 1. Hereinafter, the phase of the output current Io may be referred to as a current delay phase when the phase of the output current Io is delayed relative to the phase of the output voltage Vo, and the phase of the output current Io may be referred to as a current lead phase when the phase of the output current Io is advanced relative to the phase of the output voltage Vo.

Figure 11:
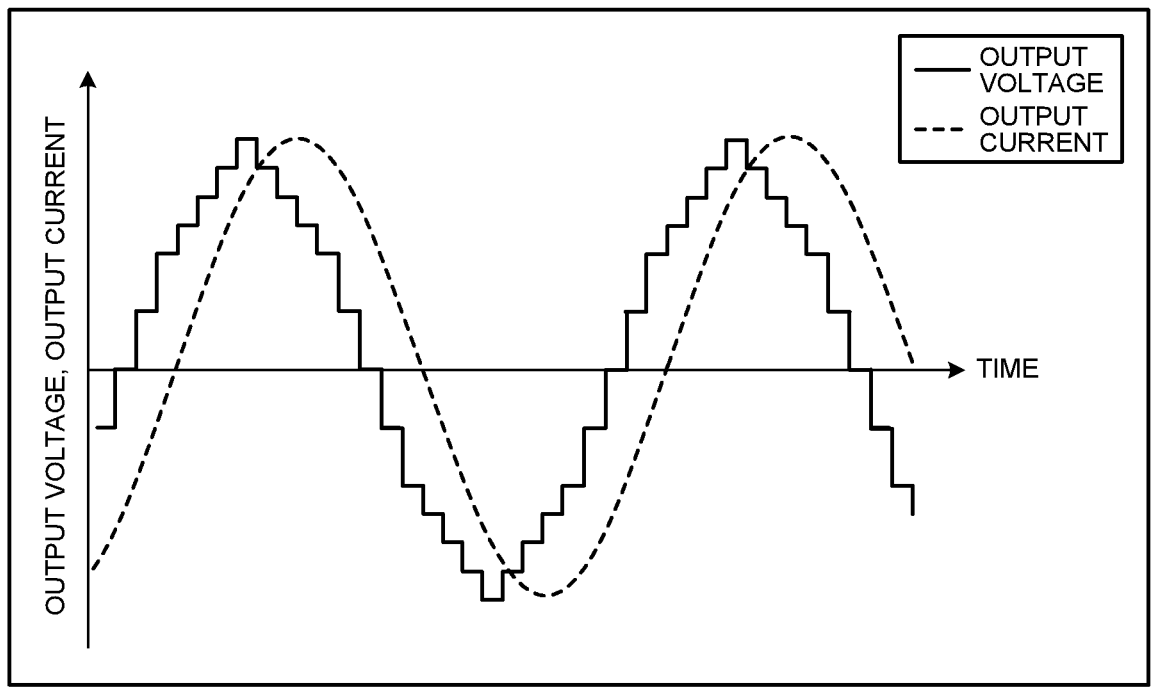
FIG. 11 is a diagram illustrating an example of the waveform of an output voltage and the waveform of an output current in the case of a current delay phase in the series multiplex inverter according to the first embodiment.
Figure 12:
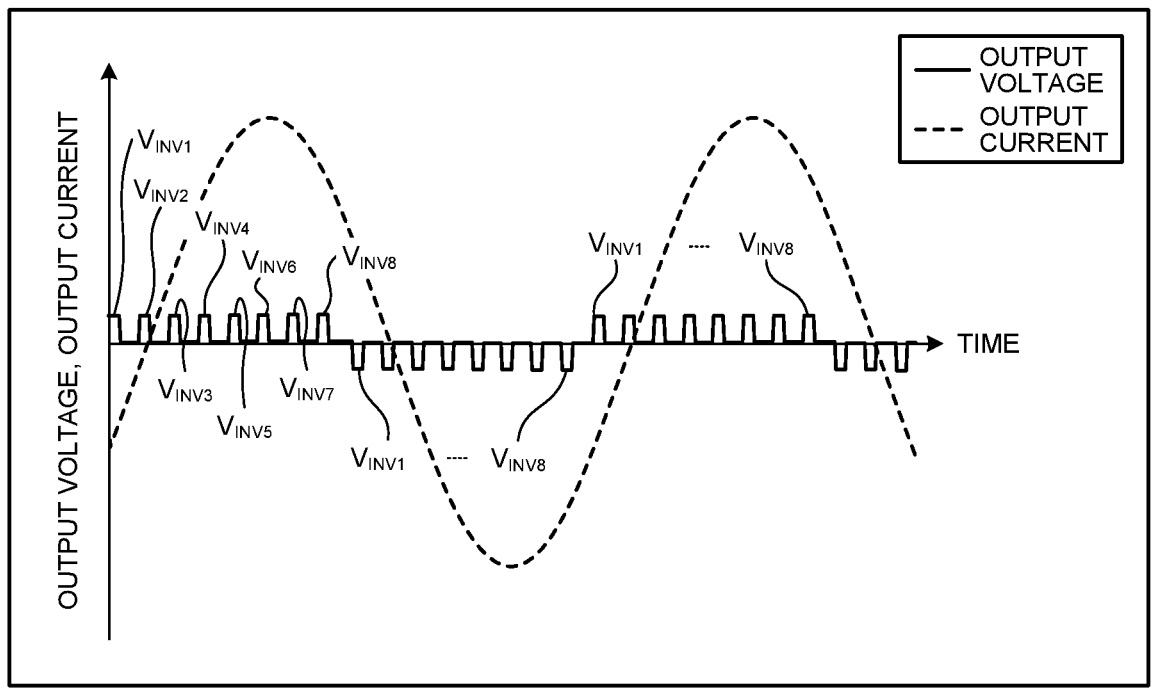
FIG. 12 is a diagram illustrating an example of the waveform of an output voltage and the waveform of an output current in the case of a current delay phase in the series multiplex inverter according to the first embodiment.

FIGS. 11 and 12 are diagrams each illustrating an example of the waveform of an output voltage and the waveform of an output current in the case of a current delay phase in the series multiplex inverter according to the first embodiment.

FIG. 11 shows the waveform of the output voltage Vo and the waveform of the output current Io from the series multiplex inverter 1 where the load 3 consumes a lot of power, similarly to FIG. 8. FIG. 12 shows the waveform of the output voltage Vo and the waveform of the output current Io from the series multiplex inverter 1 where the load 3 consumes almost no power, similarly to FIG. 9.

Figure 13:
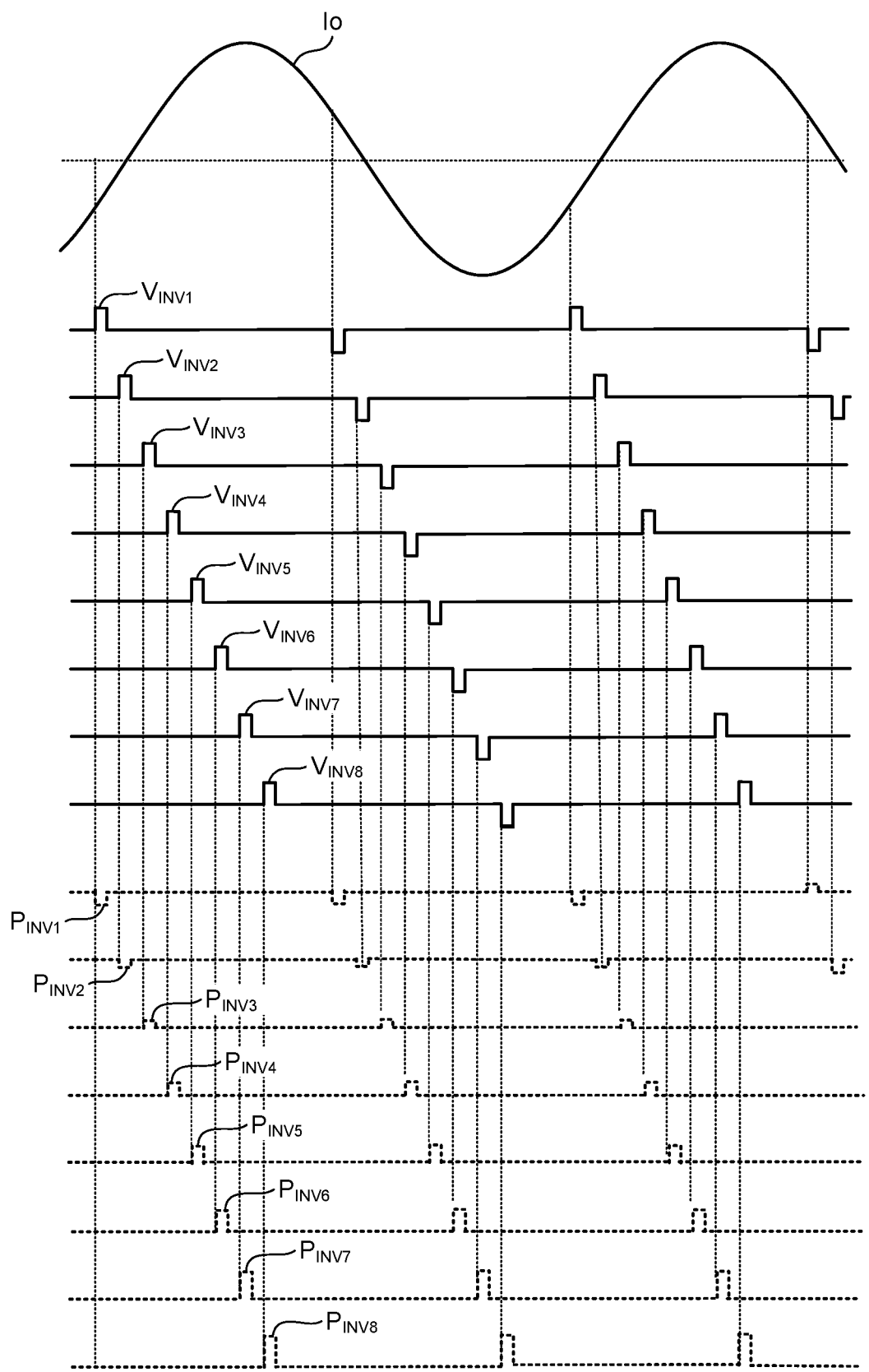
FIG. 13 is a diagram illustrating an example of the waveform of an output voltage and the waveform of an output power from each single-phase inverter in the state illustrated in FIG. 12.

FIG. 13 is a diagram illustrating an example of the waveform of an output voltage and the waveform of an output power from each single-phase inverter in the state illustrated in FIG. 12. As illustrated in FIG. 13, when the phase of the output current Io is delayed relative to the phase of the output voltage Vo from the series multiplex inverter 1, the output voltage $V_{INV}$ and the output current $I_{INV}$ have opposite polarities at some single-phase inverters 15.

The single-phase inverter 15 at which the output voltage $V_{INV}$ and the output current $I_{INV}$ have opposite polarities performs regenerative operation, whereby the capacitor 14 connected to the single-phase inverter 15 is charged by the single-phase inverter 15, and the output power $P_{INV}$ becomes negative. In the example illustrated in FIG. 13, some single-phase inverters $15_1$ and $15_2$ are performing regenerative operation, and the capacitors $14_1$ and $14_2$ connected to the single-phase inverters $15_1$ and $15_2$ are charged.

The charging of the capacitors $14_1$ and $14_2$ through the regenerative operation of the single-phase inverters $15_1$ and $15_2$ is repeated every half output voltage period To. Therefore, in the absence of discharging means for discharging the capacitors $14_1$ and $14_2$, the voltage of the capacitors $14_1$ and $14_2$ continues to increase due to repeated regenerative operation. If the voltage of the capacitors $14_1$ and $14_2$ exceeds the withstand voltage of the semiconductor elements of the single-phase inverters $15_1$ and $15_2$ or the withstand voltage of the capacitors $14_1$ and $14_2$, the semiconductor elements of the single-phase inverters $15_1$ and $15_2$ or the capacitors $14_1$ and $14_2$ fail due to overvoltage.

In the presence of discharging means for discharging the capacitors $14_1$ and $14_2$ charged through regenerative operation, the discharging means causes a loss, which increases the loss in the single-phase inverters $15_1$ and $15_2$. This leads to an increase in the size and cost of the series multiplex inverter.

As discussed above, when a phase shift occurs between the output voltage Vo and the output current Io from the series multiplex inverter 1 due to a difference between the output voltage frequency fo of the series multiplex inverter 1 and the resonance frequency of the load 3, some single-phase inverters 15 perform regenerative operation to thereby charge the capacitors 14.

The example illustrated in FIG. 11 provides a single-phase inverter 15 that performs regenerative operation. In such a case, however, because the single-phase inverter 15 outputs a rectangular wave voltage for a long time, the polarity of the output current Io is inverted and the output power $P_{INV}$ changes to positive. Where the single-phase inverter 15 performs regenerative operation but the charging time for the capacitor 14 is shorter than the discharging time for the capacitor 14, thus, the voltage of the capacitor 14 does not continue to increase.

As described above, the first phenomenon in which the output powers $P_{INV}$ from the single-phase inverters 15 differ from one another and the second phenomenon in which the voltage of the capacitor 14 increases in some of the single-phase inverters 15 occur.

In view of this, the drive signal output unit 42 changes the combination pattern of the drive signals $Sp_1$ to $Sp_n$ with the single-phase inverters $15_1$ to $15_n$ at each update period Ts set in advance. More specifically, the drive signal output unit 42 outputs the drive signals $Sp_1$ to $Sp_n$ to the single-phase inverters $15_1$ to $15_n$ in rotation that shifts, by p every update period Ts, the single-phase inverters 15 corresponding one-to-one to the drive signals $Sp_1$ to $Sp_n$ in the combination of the drive signals $Sp_1$ to $Sp_n$ with the single-phase inverters $15_1$ to $15_n$. Here, p is a natural number relatively prime to n or one. For example, in the case of n=3, p=1 or 2 is satisfied. In the case of n=8, p=1, 3, 5, or 7 is satisfied. Note that p may be limited to a natural number excluding one, that is, a natural number relatively prime to n.

Here, the timings at which the single-phase inverters 15 output rectangular wave voltages in accordance with the drive signals $Sp_1$ to $Sp_n$ are respectively referred to as the output timings $T_1$ to $T_n$. For example, the output timing at which the single-phase inverter 15 outputs the rectangular wave voltage in accordance with the drive signal $Sp_1$ is denoted by "$T_1$", and the output timing at which the single-phase inverter 15 outputs the rectangular wave voltage in accordance with the drive signal $Sp_2$ is denoted by "$T_2$". Similarly, the output timings at which the single-phase inverters 15 output the rectangular wave voltages in accordance with the drive signals $Sp_3$ to $Sp_n$ are denoted by "$T_3$" to "$T_n$".

Figure 14:
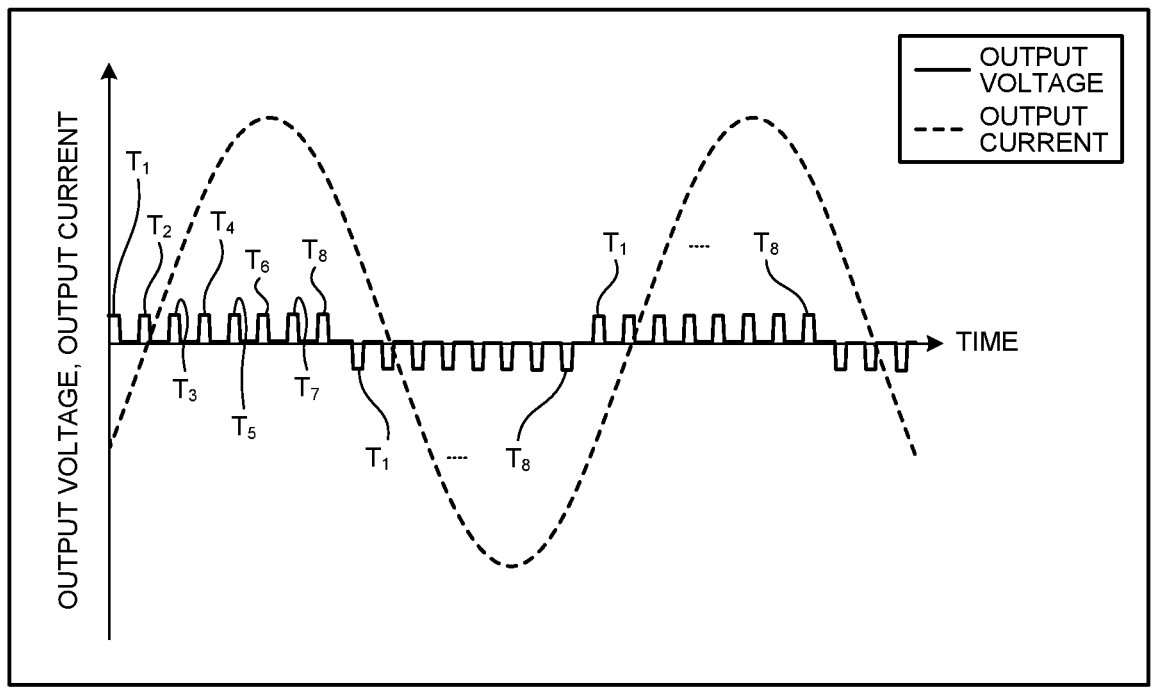
FIG. 14 is a diagram illustrating an example of the relationship between output voltage, output current, and output timings in the case of a current delay phase in the series multiplex inverter according to the first embodiment.
Figure 15:
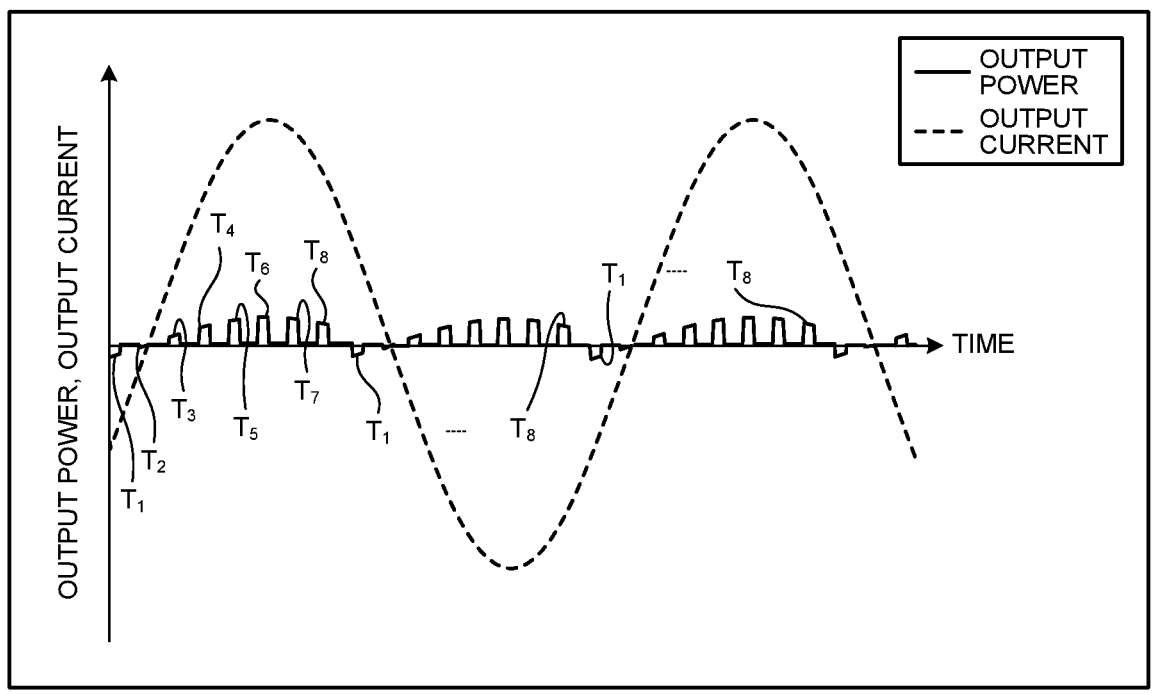
FIG. 15 is a diagram illustrating an example of the relationship between output power, output current, and output timings in the case of a current delay phase in the series multiplex inverter according to the first embodiment.

First, a case where the phase of the output current Io from the series multiplex inverter 1 is delayed relative to the phase of the output voltage Vo will be described. FIG. 14 is a diagram illustrating an example of the relationship between output voltage, output current, and output timings in the case of a current delay phase in the series multiplex inverter according to the first embodiment. FIG. 15 is a diagram illustrating an example of the relationship between output power, output current, and output timings in the case of a current delay phase in the series multiplex inverter according to the first embodiment. In FIG. 14, the horizontal axis represents time, and the vertical axis represents current values and voltage values. In FIG. 15, the horizontal axis represents time, and the vertical axis represents current values and power values.

FIGS. 14 and 15, which provide the examples in which n=8 is satisfied, illustrate the waveforms of the output voltage Vo and the output power Po and the waveform of the output current Io from the series multiplex inverter 1 in the case where the load 3 consumes almost no power are illustrated, as in FIG. 9. FIG. 14 shows the relationship between the output voltage Vo and the output timings $T_1$ to $T_8$, and FIG. 15 shows the relationship between the output power Po and the output timings $T_1$ to $T_8$.

If the combination of the drive signals $Sp_1$ to $Sp_8$ and the single-phase inverters $15_1$ to $15_8$ is fixed, each single-phase inverter 15 outputs a rectangular wave voltage every half output voltage period To at the same timing. In this case, as described above, the single-phase inverters $15_1$ and $15_2$ repeatedly perform regenerative operation, and continue to charge the capacitors $14_1$ and $14_2$. Further, the single-phase inverter $15_6$ continues to output a larger output power $P_{INV6}$ than the other single-phase inverters 15, and thus continues to generate a larger power loss than the other single-phase inverters 15.

To avoid this, the drive signal output unit 42 outputs the drive signals $Sp_1$ to $Sp_n$ to the single-phase inverters $15_1$ to $15_n$ in rotation that shifts, by p every update period Ts, each of the single-phase inverters 15 corresponding one-to-one to the drive signals $Sp_1$ to $Sp_n$ in the combination of the drive signals $Sp_1$ to $Sp_n$ with different single-phase inverters $15_1$ to $15_n$. The rotation that shifts, by p, the single-phase inverters 15 corresponding one-to-one to the drive signals $Sp_1$ to $Sp_n$ in the combination of the drive signals $Sp_1$ to $Sp_n$ with different single-phase inverters $15_1$ to $15_n$ enables the timing at which a rectangular wave voltage is output from each single-phase inverter 15 to be switched in rotation among the output timings $T_1$ to $T_n$. Therefore, repeated regenerative operation and continuous output of large output power $P_{INV}$ can be prevented.

In particular, the rotation that shifts, by p, where p is a natural number relatively prime to n or one, the single-phase inverters 15 corresponding one-to-one to the drive signals $Sp_1$ to $Sp_n$ enables the timing at which a rectangular wave voltage is output from each single-phase inverter 15 to be switched in n-period rotation among the output timings $T_1$ to $T_n$. It therefore become possible to appropriately equalize the output power $P_{INV}$ among the single-phase inverters 15 and prevent the capacitor 14 from being overcharged due to regenerative operation.

Here, the rotation that shifts the single-phase inverters 15 corresponding one-to-one to the drive signals $Sp_1$ to $Sp_n$ in the combination of the drive signals $Sp_1$ to $Sp_n$ with different single-phase inverters $15_1$ to $15_n$ will be described.

For convenience, the single-phase inverters $15_1$ to $15_n$ are referred to as single-phase inverters in the first stage to n-th stage. In this case, rotation of the single-phase inverters 15 with respect to the drive signals Sp is rotation that shifts the single-phase inverters in the direction from the first stage to the n-th stage, such that the single-phase inverter in the n-th stage is shifted by one stage to come to the first stage.

For example, the order of rotation is determined in a manner that the single-phase inverter 15 to be combined with the drive signal $Sp_1$ is changed in the order of the single-phase inverter $15_1$ in the first stage, the single-phase inverter $15_2$ in the second stage, . . . , and the single-phase inverter $15_n$ in the n-th stage, and returns to the single-phase inverter $15_1$ in the first stage by one shift from the single-phase inverter $15_n$ in the n-th stage. The drive signal output unit 42 performs such a change as to shift the single-phase inverter 15 corresponding to each drive signal Sp by p in the order of rotation every update period Ts, instead of shifting the single-phase inverter 15 corresponding to each drive signal Sp by one in the order of rotation every update period Ts.

FIG. 16 is a diagram illustrating an example of the output timing at which each single-phase inverter outputs a rectangular wave voltage on an update-period-by-update-period basis. FIG. 16 illustrates an example in which n=8 and p=5 are satisfied. As illustrated in FIG. 16, the single-phase inverter $15_1$ outputs rectangular wave voltages at the output timing $T_1$ in the first period, at the output timing $T_6$ in the second period, at the output timing $T_3$ in the third period, and at the output timing $T_8$ in the fourth period.

Further, the single-phase inverter $15_1$ outputs rectangular wave voltages at the output timing $T_5$ in the fifth period, at the output timing $T_2$ in the sixth period, at the output timing $T_7$ in the seventh period, and at the output timing $T_4$ in the eighth period. Then, the single-phase inverter $15_1$ outputs a rectangular wave voltage at the output timing $T_1$ in the ninth period, which is the same as in the first period.

As discussed above, the single-phase inverter $15_1$ repeats the process of outputting rectangular wave voltages in order of the output timings $T_1$, $T_6$, $T_3$, $T_8$, $T_5$, $T_2$, $T_7$, and $T_4$ every eight periods. Similarly to the single-phase inverter $15_1$, the single-phase inverters $15_2$ to $15_8$ also switch the outputs of rectangular wave voltages in rotation that shifts by five among the output timings $T_1$ and $T_8$. Therefore, the amount of power generation can be equalized among the single-phase inverters 15 in the time of eight output voltage periods To, and the power loss can be appropriately equalized among the single-phase inverters 15.

The single-phase inverter $15_1$ can output a rectangular wave voltage at the output timing $T_6$ where the output power $P_{INV}$ is large in the period next to the period in which the single-phase inverter $15_1$ outputs a rectangular wave voltage at the output timing $T_1$ where the output power $P_{INV}$ is small. Therefore, the capacitor 14 charged through regenerative operation can be quickly discharged, and voltage fluctuations in the capacitor 14 can be minimized. Similarly to the single-phase inverter $15_1$, the single-phase inverters $15_2$ to $15_8$ can also moderate voltage fluctuations in the capacitors 14.

Although the above description is made as to an example in which n=8 and p=5 are satisfied, effects similar to those described above can be obtained in examples other than the example in which n=8 and p=5 are satisfied. Specifically, in the case of n=4×k, effects similar to those described above can be obtained using p=n/2+1. Here, k is a natural number. For example, in the case of n=4, p=3 is satisfied, and in the case of n=12, p=7 is satisfied.

Alternatively, in the case of n=2×k+1, effects similar to those described above can be obtained using p=(n+1)/2. For example, in the case of n=5, p=3 is satisfied. In the case of n=7, p=4 is satisfied, and in the case of n=9, p=5 is satisfied.

Alternatively, in the case of n=4×k+2, effects similar to those described above can be obtained using p=n/2+2. For example, in the case of n=6, p=5 is satisfied. In the case of n=10, p=7 is satisfied, and in the case of n=14, p=9 is satisfied.

The rotation that shifts the inverters by p, where p is a natural number relatively prime to n or one, enables the timing at which a rectangular wave voltage is output from each single-phase inverter 15 to be switched in n-period rotation among the output timings $T_1$ to $T_n$. Therefore, in the case of n=4×k, p may be a natural number other than n/2+1. In the case of n=2×k+1, p may be a natural number other than (n+1)/2, and in the case of n=4×k+2, p may be a natural number other than n/2+2.

Next, a case where the output current Io from the series multiplex inverter 1 is advanced relative to the output voltage Vo will be described. FIG. 17 is a diagram illustrating an example of the relationship between output voltage, output current, and output timings for the case of a lead phase in the series multiplex inverter according to the first embodiment. FIG. 18 is a diagram illustrating an example of the relationship between output power, output current, and output timings for the case of a lead phase in the series multiplex inverter according to the first embodiment. In FIG. 17, the horizontal axis represents time, and the vertical axis represents current values and voltage values. In FIG. 18, the horizontal axis represents time, and the vertical axis represents current values and power values.

FIGS. 17 and 18, which provide examples in which n=8 is satisfied, illustrate the waveform of the output voltage Vo or the output power Po and the waveform of the output current Io from the series multiplex inverter 1 in the case where the load 3 consumes almost no power, as in FIGS. 14 and 15.

FIG. 19 is a diagram illustrating another example of the output timing at which each single-phase inverter outputs a rectangular wave voltage on an update-period-by-update-period basis. In FIGS. 19, n=8 and p=3 are satisfied. As illustrated in FIG. 19, the single-phase inverter $15_1$ repeats the process of outputting rectangular wave voltages in order of the output timings $T_1$, $T_4$, $T_7$, $T_2$, $T_5$, $T_8$, $T_3$, and $T_6$ every eight periods. Similarly to the single-phase inverter $15_1$, the single-phase inverters $15_2$ to $15_8$ also switch the output of rectangular wave voltages in rotation that shifts by three among the output timings $T_1$ and $T_8$.

The single-phase inverter $15_1$ can output a rectangular wave voltage at the output timing $T_3$ where the output power $P_{INV}$ is large in the period next to the period in which the single-phase inverter $15_1$ outputs a rectangular wave voltage at the output timing $T_8$ where the output power $P_{INV}$ is small. Therefore, the capacitor 14 charged through regenerative operation can be quickly discharged, and voltage fluctuations in the capacitor 14 can be minimized. Similarly to the single-phase inverter $15_1$, the single-phase inverters $15_2$ to $15_8$ can also moderate voltage fluctuations in the capacitors 14.

Therefore, the amount of power generation can be equalized among the single-phase inverters 15 in the time of eight update periods Ts, and the power loss can be appropriately equalized among the single-phase inverters 15.

Although the above description is made as to an example in which n=8 and p=3 are satisfied, effects similar to those described above can be obtained in examples other than the example in which n=8 and p=3 are satisfied. Specifically, in the case of n=4×k, effects similar to those described above can be obtained using p=n/2−1. For example, in the case of n=4, p=1 is satisfied, and in the case of n=12, p=5 is satisfied.

Alternatively, in the case of n=2×k+1, effects similar to those described above can be obtained using p=(n−1)/2. For example, in the case of n=3, p=1 is satisfied. In the case of n=5, p=2 is satisfied, and in the case of n=7, p=3 is satisfied.

Alternatively, in the case of n=4×k+2, effects similar to those described above can be obtained using p=n/2−2. For example, in the case of n=6, p=1 is satisfied. In the case of n=10, p=3 is satisfied, and in the case of n=14, p=5 is satisfied.

In the case of a current lead phase as well, the rotation that shifts the inverters by p, where p is a natural number relatively prime to n or one, enables the timing at which a rectangular wave voltage is output from each single-phase inverter 15 to be switched in n-period rotation among the output timings $T_1$ to $T_n$. Therefore, in the case of n=4×k, p may be a natural number other than n/2−1. In the case of n=2×k+1, p may be a natural number other than (n−1)/2, and in the case of n=4×k−2, p may be a natural number other than n/2−2.

An exemplary case of a current delay phase and an exemplary case of a current lead phase have been mainly described so far. However, even when the phase of the output current Io and the phase of the output voltage Vo are substantially the same, the power loss can be appropriately equalized among the single-phase inverters 15.

Reference is made back to FIG. 1 to continue the explanation of the control unit 40 of the series multiplex inverter 1. An operation receiving unit 43 of the control unit 40 receives input of the above-described information on p through operation performed on the operation unit 50, and inputs the information on p received by the operation receiving unit 43 to the drive signal output unit 42. On the basis of p input from the operation receiving unit 43, the drive signal output unit 42 changes the combination pattern of the n drive signals $Sp_1$ to $Sp_n$ with the single-phase inverters $15_1$ to $15_n$ at each update period Ts set in advance. Note that the operation unit 50 is, for example, a DIP switch, but may be a detachable operation device.

The operation unit 50 is configured to receive an operation of inputting the value of p itself. In this case, the operation unit 50 can be, for example, a DIP switch through which a natural number can be selected. Further, the operation unit 50 can receive an operation of inputting indirect information for setting p, instead of the value of p itself. For example, the operation unit 50 can selectively set first information indicating that the phase of the output current Io is delayed relative to the phase of the output voltage Vo and second information indicating that the phase of the output current Io is advanced relative to the phase of the output voltage Vo. In a case where the operation unit 50 is a DIP switch including one switch, turning on the DIP switch sets the first information, and turning off the DIP switch sets the second information.

The operation receiving unit 43 determines p from the state of the DIP switch. For example, in the case of n=8, p=n/2+1=5 is set when the DIP switch is on, and p=n/2−1=3 is set when the DIP switch is off. In the case of n=9, p=(n+1)/2=5 is set when the DIP switch is on, and p=(n−1)/2=4 is set when the DIP switch is off.

As described above, the series multiplex inverter 1 includes the operation unit 50 and the operation receiving unit 43. Therefore, even in a case where the characteristics of the load 3 change depending on the season or the like and the phase shift of the output voltage Vo with respect to the output current Io is switched between a delay and a lead, the power loss can be appropriately equalized among the single-phase inverters 15.

In a case where the time period of a current delay phase and the time period of a current lead phase are determined in advance, p may be set to be switched in each time period. For example, a combination of a time period and p can be set by the operation unit 50 on a time-period-by-time-period basis. Among the combinations of time periods and p set in the operation unit 50, the information on p combined with the time period including the present time is input by the operation receiving unit 43 to the drive signal output unit 42.

Instead of setting a combination of a time period and p on a time-period-by-time-period basis, the operation unit 50 can set a combination of a temperature range and p on a temperature-range-by-temperature-range basis. In this case, among the combinations of temperature ranges and p set in the operation unit 50, the information of p combined with the temperature range including the present temperature is input by the operation receiving unit 43 to the drive signal output unit 42.

Figure 20:
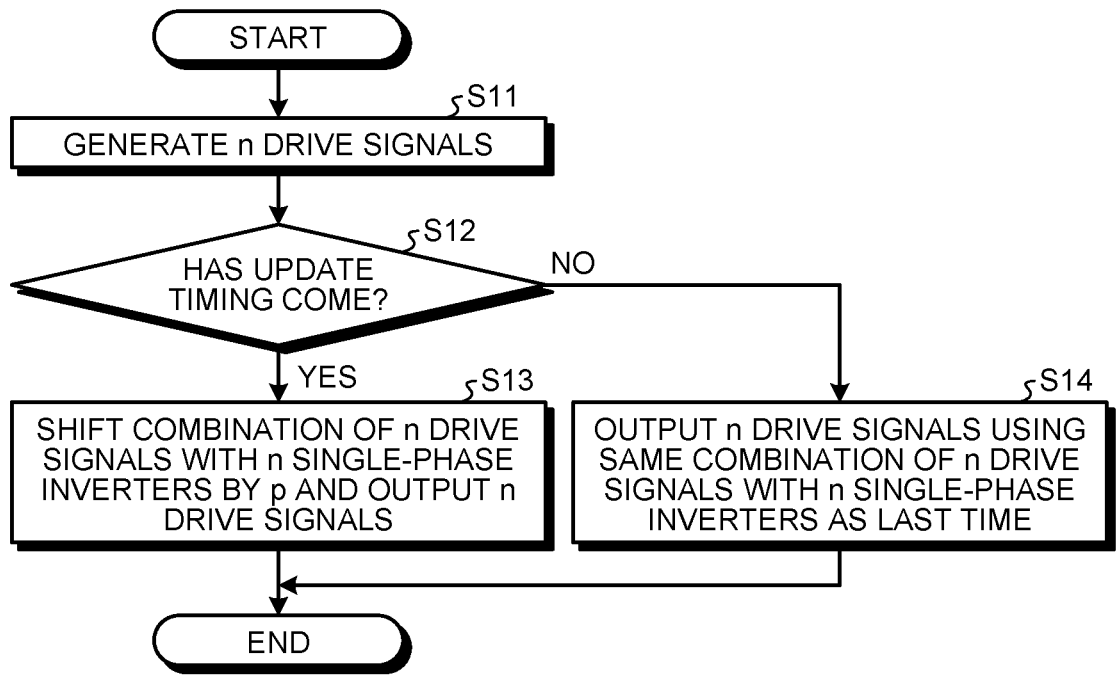
FIG. 20 is a flowchart illustrating an exemplary process that is performed by a control unit according to the first embodiment.

Next, the operation of the control unit 40 will be described using a flowchart. FIG. 20 is a flowchart illustrating an exemplary process that is performed by the control unit according to the first embodiment. As illustrated in FIG. 20, the control unit 40 generates the n drive signals Sp sequentially out of phase by the first phase difference φ1 (step S11).

Next, the control unit 40 determines whether the update timing has come (step S12). The update timing occurs, for example, every update period Ts. In response to determining that the update timing has come (step S12: Yes), the control unit 40 shifts the combination of the n drive signals Sp with the n single-phase inverters 15 by p and outputs the n drive signals Sp to the n single-phase inverters 15 (step S13).

In response to determining that the update timing has not come (step S12: No), the control unit 40 outputs the n drive signals Sp to the n single-phase inverters 15 using the same combination of the n drive signals Sp with the n single-phase inverters 15 as last time (step S14). The control unit 40 repeatedly performs the process illustrated in FIG. 20 every half output voltage period To.

Figure 21:
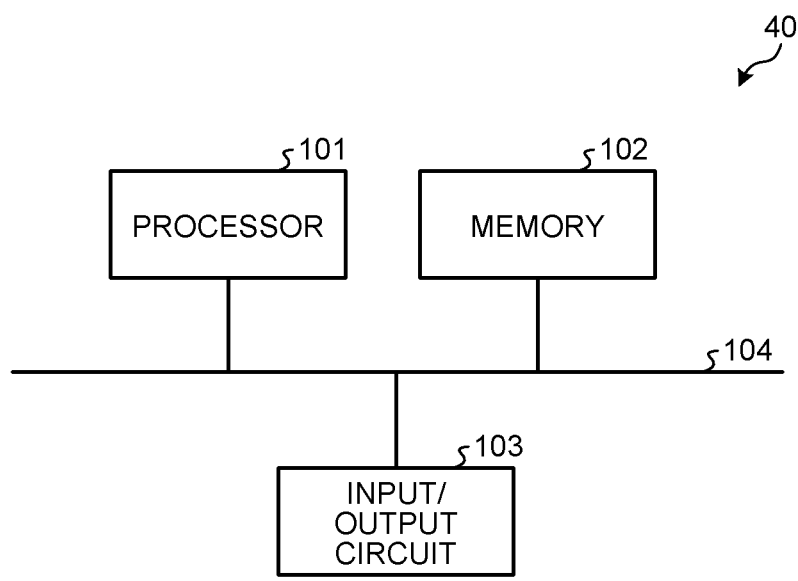
FIG. 21 is a diagram illustrating an exemplary hardware configuration of the control unit of the series multiplex inverter according to the first embodiment.

Here, a hardware configuration of the control unit 40 of the series multiplex inverter 1 according to the first embodiment will be described. FIG. 21 is a diagram illustrating an exemplary hardware configuration of the control unit of the series multiplex inverter according to the first embodiment. As illustrated in FIG. 21, the control unit 40 of the series multiplex inverter 1 includes a processor 101, a memory 102, and an input/output circuit 103. The processor 101, the memory 102, and the input/output circuit 103 can exchange data with one another via a bus 104. The memory 102 includes a recording medium on which a computer-readable program is recorded.

The processor 101 reads and executes a program stored in the memory 102 to execute the functions of the drive signal generation unit 41, the drive signal output unit 42, and the operation receiving unit 43 described above. The processor 101 is an example of a processing circuit, and includes, for example, one or more of a central processing unit (CPU), a digital signal processor (DSP), and a system large scale integration (LSI). Examples of the memory 102 include a non-volatile or volatile semiconductor memory, a magnetic disk, a flexible disk, an optical disc, a compact disc, a mini disc, a digital versatile disc (DVD), and the like. Examples of the non-volatile or volatile semiconductor memory include a random access memory (RAM), a read only memory (ROM), a flash memory, an erasable programmable read only memory (EPROM), an electrically erasable programmable read-only memory (EEPROM, registered trademark), and the like.

Note that the control unit 40 described above may be implemented by dedicated hardware that implements the same functions as the processor 101 and the memory 102 illustrated in FIG. 21. Dedicated hardware is, for example, a single circuit, a composite circuit, a programmed processor, a parallel programmed processor, an application specific integrated circuit (ASIC), a field programmable gate array (FPGA), or a processing circuit including a combination thereof. A part of the control unit 40 may be implemented by dedicated hardware, and the rest of the control unit 40 may be implemented by the processor 101 and the memory 102 illustrated in FIG. 21.

As described above, the series multiplex inverter 1 according to the first embodiment includes the power conversion unit 10, the drive signal generation unit 41, and the drive signal output unit 42. The power conversion unit 10 includes the n single-phase inverters 15, where n is an integer of three or more, and the output terminals 16 and 17 of the n single-phase inverters 15 are connected in series. The drive signal generation unit 41 generates the n drive signals Sp that cause different single-phase inverters of the n single-phase inverters 15 to output n rectangular wave voltages sequentially out of phase by the first phase difference φ1 set in advance. The drive signal output unit 42 outputs the n drive signals Sp to the n single-phase inverters 15 in rotation that shifts, by p every update period Ts, the single-phase inverters 15 corresponding one-to-one to the n drive signals Sp in a combination of the n drive signals Sp with the n single-phase inverters 15, where m is a natural number, p is a natural number relatively prime to n or one, and one update period Ts is the m-fold time of half the output voltage period To of the power conversion unit 10. Consequently, the timing at which a rectangular wave voltage is output from each single-phase inverter 15 can be switched in rotation among the output timings $T_1$ to $T_n$ in the time of n update periods Ts. Therefore, the amount of power generation can be equalized among the single-phase inverters 15 in the time of n update periods Ts, and the power loss can be appropriately equalized among the single-phase inverters 15.

The series multiplex inverter 1 includes the operation receiving unit 43 that receives the operation of setting p. The drive signal output unit 42 outputs the n drive signals Sp to the n single-phase inverters 15 on the basis of p received by the operation receiving unit 43. Thus, even when the load 3 having different characteristics is connected to the series multiplex inverter 1, the power loss can be appropriately equalized among the single-phase inverters 15 through operation performed on the operation receiving unit 43.

When n is 2×k+1, p is at least one of (n+1)/2 and (n−1)/2. Consequently, in the case of n=2×k+1, even when the output voltage Vo is out of phase with the output current Io, the power loss can be appropriately equalized among the single-phase inverters 15.

When n is 4×k, p is at least one of n/2+1 and n/2−1. Consequently, in the case of 4×k, even when the output voltage Vo is out of phase with the output current Io, the power loss can be appropriately equalized among the single-phase inverters 15.

When n is 4×k+2, p is at least one of n/2+2 and n/2−2. Consequently, in the case of 4×k+2, even when the output voltage Vo is out of phase with the output current Io, the power loss can be appropriately equalized among the single-phase inverters 15.

Second Embodiment

The second embodiment is different from the first embodiment in that a phase shift of the output voltage Vo with respect to the output current Io can be detected and p can be automatically switched. In the following description, components having the same functions as those in the first embodiment are denoted by the same reference signs, and descriptions thereof are omitted. The difference from the series multiplex inverter 1 according to the first embodiment is mainly described.

Figure 22:
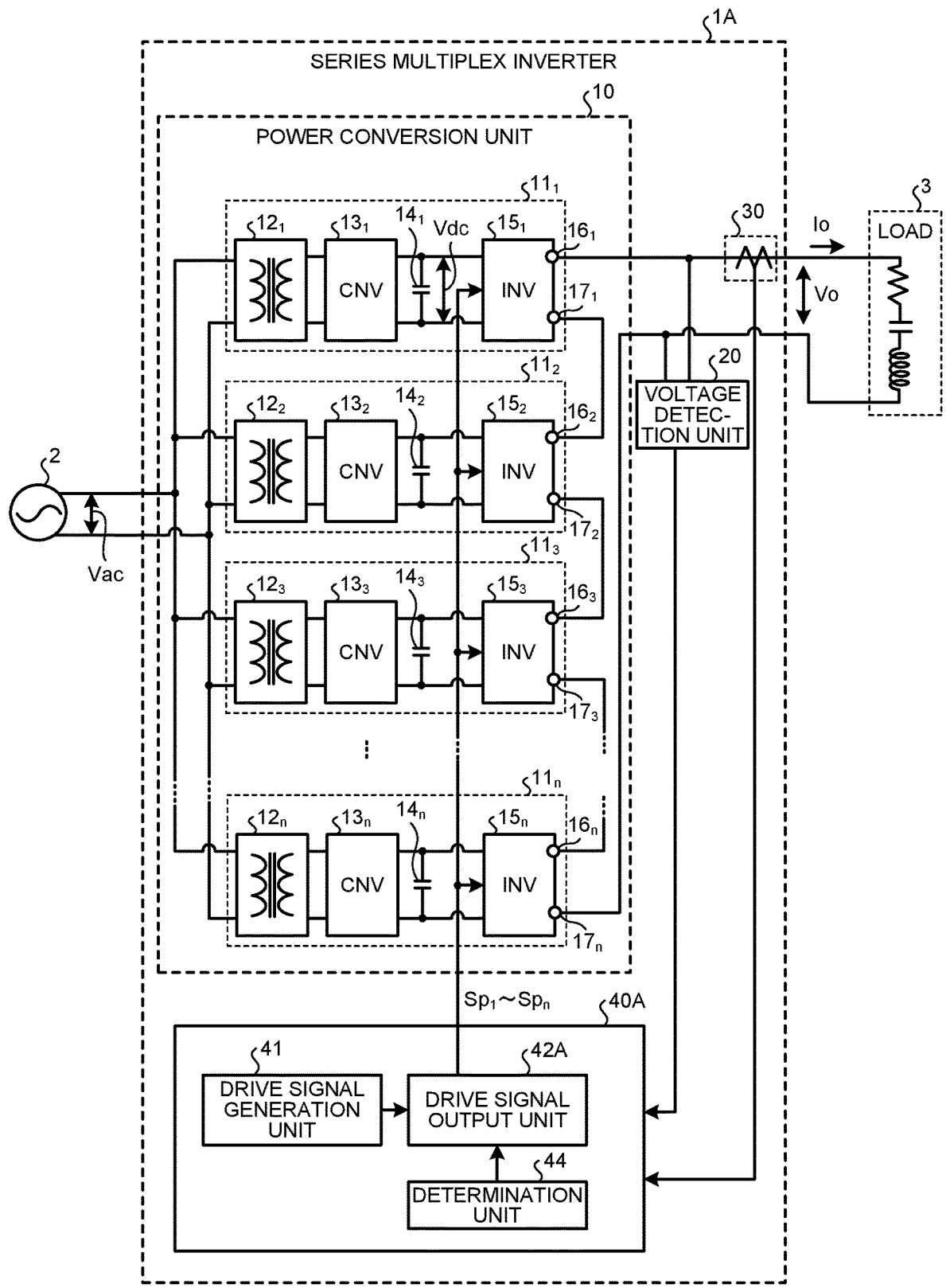
FIG. 22 is a diagram illustrating an exemplary configuration of a series multiplex inverter according to a second embodiment.

FIG. 22 is a diagram illustrating an exemplary configuration of a series multiplex inverter according to the second embodiment. As illustrated in FIG. 22, the series multiplex inverter 1A according to the second embodiment includes the power conversion unit 10, the voltage detection unit 20, the current detection unit 30, and a control unit 40A.

A control unit 40A includes the drive signal generation unit 41, a drive signal output unit 42A, and a determination unit 44. The determination unit 44 determines whether the phase of the output current Io is advanced or delayed relative to the phase of the output voltage Vo on the basis of the output voltage Vo detected by the voltage detection unit 20 and the output current Io detected by the current detection unit 30.

The determination unit 44 acquires the detected voltage value Vdet repeatedly output from the voltage detection unit 20 and the detected current value Idet repeatedly output from the current detection unit 30. The determination unit 44 performs a discrete Fourier transform on the detected voltage value Vdet and the detected current value Idet, using a sampling period that is an integral multiple of the output voltage frequency fo. Through the discrete Fourier transform, the determination unit 44 extracts the primary component Io1 of the output current Io and the primary component Vo1 of the output voltage Vo. Note that, instead of the discrete Fourier transform, the determination unit 44 can use a method and algorithm for extracting only the primary component from a signal having a plurality of high-order frequency components, thereby extracting the primary component Io1 of the output current Io and the primary component Vo1 of the output voltage Vo.

In a case where the Fourier transform is performed by the determination unit 44, the primary component Vo1 of the output voltage Vo and the primary component Io1 of the output current Io are expressed in complex notation by Formulas (1) and (2) below. In Formulas (1) and (2) below, "Vo1Re" indicates the real part of Vo1, "Io1Re" indicates the real part of Io1, "Vo1Im" indicates the imaginary part of Vo1, "Io1Im" indicates the imaginary part of Io1, and "j" indicates an imaginary unit.

$$Vo1 = Vo1Re + j \times Vo1Im \quad (1)$$

$$Io1 = Io1Re + j \times Io1Im \quad (2)$$

The determination unit 44 can compute the phase θ through calculations of Formulas (3) and (4) below to thereby determine whether the phase of the output current Io is advanced or delayed relative to the phase of the output voltage Vo. The phase θ indicates a phase shift of the output current Io with respect to the output voltage Vo.

$$Z = Vo/Io \quad (3)$$

$$\theta = \arctan(Im(Z)/Re(Z)) \quad (4)$$

Note that the determination unit 44 can obtain the waveform of the output current Io from the detected current value Idet and the waveform of the output voltage Vo from the detected voltage value Vdet, and compare the waveform of the output current Io with the waveform of the output voltage Vo. The determination unit 44 can determine, from a result of the comparison between the waveform of the output current Io and the waveform of the output voltage Vo, whether the phase of the output current Io is advanced or delayed relative to the phase of the output voltage Vo.

The drive signal output unit 42A outputs the drive signals $Sp_1$ to $Sp_n$ to the single-phase inverters $15_1$ to $15_n$ every update period Ts on the basis of p determined from the phase shift determination result provided by the determination unit 44.

For example, in the case of n=4×k, the drive signal output unit 42A designates either n/2+1 or n/2−1 as p on the basis of the determination result provided by the determination unit 44. Specifically, in response to the determination unit 44 determining that the phase of the output current Io is delayed relative to the phase of the output voltage Vo, the drive signal output unit 42A designates n/2+1 as p. In response to the determination unit 44 determining that the phase of the output current Io is advanced relative to the phase of the output voltage Vo, the drive signal output unit 42A designates n/2−1 as p.

In the case of n=2×k+1, the drive signal output unit 42A designates either (n+1)/2 or (n−1)/2 as p on the basis of the determination result provided by the determination unit 44. Specifically, in response to the determination unit 44 determining that the phase of the output current Io is delayed relative to the phase of the output voltage Vo, the drive signal output unit 42A designates (n+1)/2 as p. In response to the determination unit 44 determining that the phase of the output current Io is advanced relative to the phase of the output voltage Vo, the drive signal output unit 42A designates (n−1)/2 as p.

In the case of n=4×k+2, the drive signal output unit 42A computes either p=n/2+2 or p=n/2−2 to determine p, on the basis of the determination result provided by the determination unit 44. Specifically, in response to the determination unit 44 determining that the phase of the output current Io is delayed relative to the phase of the output voltage Vo, the drive signal output unit 42A computes p=n/2+2 to determine p. In response to the determination unit 44 determining that the phase of the output current Io is advanced relative to the phase of the output voltage Vo, the drive signal output unit 42A computes p=n/2−2 to determine p.

The drive signal output unit 42A switches the single-phase inverters 15 corresponding one-to-one to the drive signals $Sp_1$ to $Sp_n$ in rotation that shifts each of the single-phase inverters by p determined as described above every update period Ts. Consequently, even in a case where the state is switched between a current delay phase and a current lead phase due to a change in the characteristics of the load 3 or the like, it becomes possible to appropriately equalize the output power $P_{INV}$ among the single-phase inverters 15 and prevent the capacitor 14 from being overcharged due to the regenerative operation.

In the above-described examples, the determination unit 44 that determines a phase shift of the output current Io with respect to the output voltage Vo is provided in the control unit 40A. Alternatively, the function of the determination unit 44 may be provided in an external device. In this case, the external device can notify through a wired or wireless communication the control unit 40A of a result of determination of the phase shift. The drive signal output unit 42A of the control unit 40A can output the drive signals $Sp_1$ to $Sp_n$ to the single-phase inverters $15_1$ to $15_n$ on the basis of p determined from the phase shift determination result provided by the external device.

Figure 23:
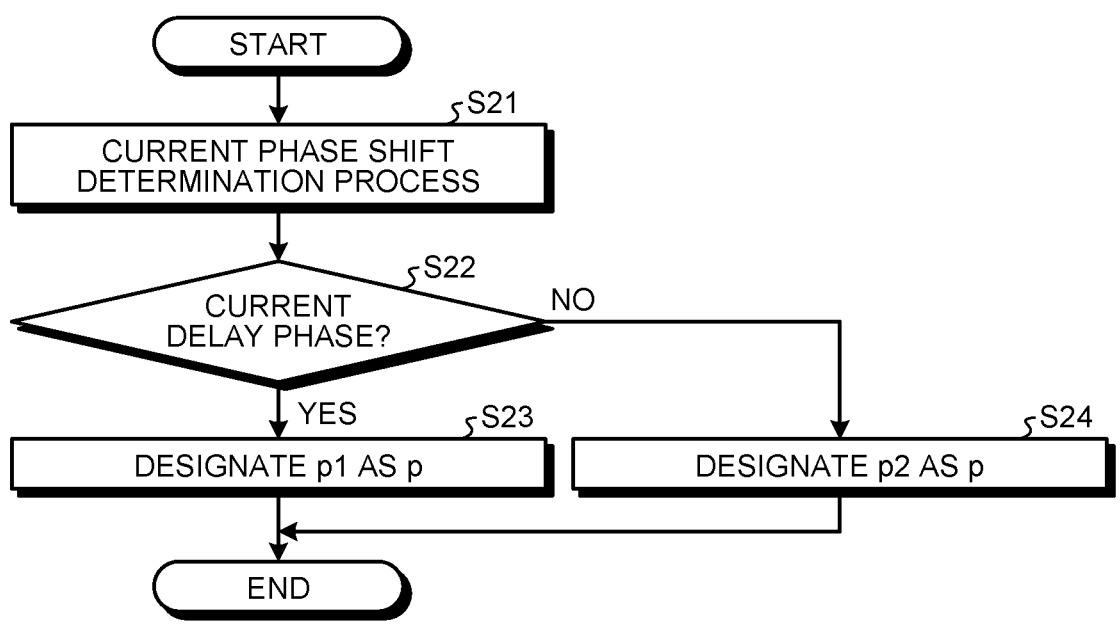
FIG. 23 is a flowchart illustrating an exemplary determination process that is performed by a control unit according to the second embodiment.

Next, the process of determining p by the control unit 40A will be described using a flowchart. FIG. 23 is a flowchart illustrating an exemplary determination process that is performed by the control unit according to the second embodiment. As illustrated in FIG. 23, the control unit 40A performs a current phase shift determination process (step S21). The phase shift determination process is a process of determining which of a current delay phase and a current lead phase has occurred. A current delay phase indicates that the phase of the output current Io is delayed relative to the phase of the output voltage Vo, as described above, and a current lead phase indicates that the phase of the output current Io is advanced relative to the phase of the output voltage Vo, as described above.

Next, the control unit 40A determines whether the result of the current phase shift determination process indicates a current delay phase (step S22). When the result of the current phase shift determination process indicates a current delay phase (step S22: Yes), the control unit 40A designates p1 as p (step S23). When the result of the current phase shift determination process does not indicate a current delay phase (step S22: No), the control unit 40A designates p2 as p (step S24). The control unit 40A can perform the process illustrated in FIG. 22 every preset period.

Here, "p1" in step S23 is p=n/2+1 in the case of n=4×k, p=(n+1)/2 in the case of n=2×k+1, and p=n/2+2 in the case of n=4×k+2. In addition, "p2" in step S23 is p=n/2−1 in the case of n=4×k, p=(n−1)/2 in the case of n=2×k+1, and p=n/2−2 in the case of n=4×k+2.

An exemplary hardware configuration of the control unit 40A of the series multiplex inverter 1A according to the second embodiment is the same as the exemplary hardware configuration illustrated in FIG. 21. The processor 101 can read and execute a program stored in the memory 102 to execute the functions of the drive signal generation unit 41, the drive signal output unit 42A, and the determination unit 44.

As described above, the series multiplex inverter 1A according to the second embodiment includes the voltage detection unit 20 that detects the output voltage Vo from the power conversion unit 10, the current detection unit 30 that detects the output current Io from the power conversion unit 10, and the determination unit 44. The determination unit 44 determines whether the phase of the output current Io is advanced or delayed relative to the phase of the output voltage Vo on the basis of the output voltage Vo detected by the voltage detection unit 20 and the output current Io detected by the current detection unit 30. In response to the determination unit 44 determining that the phase of the output current Io is delayed relative to the phase of the output voltage Vo, the drive signal output unit 42A outputs the n drive signals Sp to the n single-phase inverters 15 in rotation that shifts, by the first number, namely p1 described above, each of the single-phase inverters 15 corresponding one-to-one to the n drive signals Sp in a combination of the n drive signals Sp with different single-phase inverters of the n single-phase inverters 15. In response to the determination unit 44 determining that the phase of the output current Io is advanced relative to the phase of the output voltage Vo, the drive signal output unit 42A outputs the n drive signals Sp to the n single-phase inverters 15 in rotation that shifts, by the second number, namely p2 described above, each of the single-phase inverters 15 corresponding one-to-one to the n drive signals Sp in a combination of the n drive signals Sp with different single-phase inverters of the n single-phase inverters 15. Consequently, even in a case where the state is switched between a current delay phase and a current lead phase due to a change in the characteristics of the load 3 or the like, it becomes possible to appropriately equalize the output power $P_{INV}$ among the single-phase inverters 15 and prevent the capacitor 14 from being overcharged due to regenerative operation. Note that p1 and p2 may be limited to a natural number excluding one, that is, a natural number relatively prime to n.

Although the above-described series multiplex inverters 1 and 1A include the n transformers 12, the series multiplex inverters 1 and 1A may include one multi-output transformer instead of the n transformers 12. In this case, the primary side of the multi-output transformer is connected to the single-phase AC power supply 2, and AC voltage is output from the n secondary sides of the multi-output transformer to the n rectifier circuits 13.

In the above-described examples, the single-phase AC voltage Vac from the single-phase AC power supply 2 is converted into the DC voltage Vdc. However, the power supply is not limited to the single-phase AC power supply 2. For example, the series multiplex inverters 1 and 1A may be configured to convert three-phase AC voltage from a three-phase AC power supply, in place of the single-phase AC power supply 2, into the DC voltage Vdc. In this case, a three-phase transformer is used as the transformer 12, and a three-phase rectifier circuit is used as the rectifier circuit 13, whereby three-phase AC voltage can be converted into the DC voltage Vdc.

In the above-described examples, the DC voltage Vdc is input to each single-phase inverter 15 from an independent DC power supply including the transformer 12, the rectifier circuit 13, and the capacitor 14. Alternatively, the DC voltage Vdc may be input from one DC power supply to the n single-phase inverters 15. In this case, the output voltages $V_{INV}$ from the individual single-phase inverters 15 are input to the primary sides of n transformers provided on a single-phase-inverter-by-single-phase inverter basis. The secondary sides of the n transformers are connected in series, whereby the output voltages $V_{INV}$ from the single-phase inverters 15 are combined and output to the load 3.

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST 1, 1A series multiplex inverter; 2 single-phase AC power supply; 3 load; 10 power conversion unit; $11_1$ to $11_n$ power conversion block; 12, $12_1$ to $12_n$ transformer; 13, $13_1$ to $13_n$ rectifier circuit; 14, $14_1$ to $14_n$ capacitor; 15, $15_1$ to $15_n$ single-phase inverter; 16, $16_1$ to $16_n$, 17, $17_1$ to $17_n$ output terminal; 18 gate driver; 20 voltage detection unit; 30 current detection unit; 40, 40A control unit; 41 drive signal generation unit; 42, 42A drive signal output unit; 43 operation receiving unit; 44 determination unit; 50 operation unit; 60 effective value calculation unit; 61 current command output unit; 62 subtractor; 63 current control unit; 64 carrier wave output unit; 65 comparator; 66 signal generation unit.

The invention claimed is:

1. A series multiplex inverter comprising:
   power conversion circuitry including n single-phase inverters, where n is an integer of three or more, the n single-phase inverters having output terminals connected in series;
   drive signal generation circuitry to generate n drive signals that cause different single-phase inverters of the n single-phase inverters to output, for the same length of time, n rectangular wave voltages sequentially out of phase; and
   drive signal output circuitry to output the n drive signals to the n single-phase inverters in rotation that shifts, by p every m-fold time of half an output voltage period of the power conversion circuitry, the single-phase inverters corresponding one-to-one to the n drive signals in a combination of the n drive signals with different single-phase inverters of the n single-phase inverters, where m is a natural number and p is a natural number relatively prime to n or one.

2. The series multiplex inverter according to claim 1, comprising
   operation receiving circuitry to receive an operation of setting the p, wherein
   the drive signal output circuitry outputs the n drive signals to the n single-phase inverters on a basis of the p received by the operation receiving circuitry.

3. The series multiplex inverter according to claim 1, wherein
   the p includes a first number and a second number that are different from each other,
   the series multiplex inverter includes:
   voltage detection circuitry to detect an output voltage from the power conversion circuitry;
   current detection circuitry to detect an output current from the power conversion circuitry; and
   determination circuitry to determine whether a phase of the output current is advanced or delayed relative to a phase of the output voltage on the basis of the output voltage detected by the voltage detection circuitry and the output current detected by the current detection circuitry,
   in response to the determination circuitry determining that the phase of the output current is delayed relative to the phase of the output voltage, the drive signal output [[unit]] circuitry outputs the n drive signals to the n single-phase inverters in rotation that shifts, by the first number, the single-phase inverters corresponding one-to-one to the n drive signals in the combination, and in response to the determination circuitry determining that the phase of the output current is advanced relative to the phase of the output voltage, the drive signal output circuitry outputs the n drive signals to the n single-phase inverters in rotation that shifts, by the second number, the single-phase inverters corresponding one-to-one to the n drive signals in the combination.

4. The series multiplex inverter according to claim 2, wherein the n is 2×k+1, where k is a natural number, and the p is at least one of n/2+½ and n/2−½.

5. The series multiplex inverter according to claim 2, wherein the n is 4×k, where k is a natural number, and
the p is at least one of n/2+1 and n/2−1.

6. The series multiplex inverter according to claim 2, wherein the n is 4×k+2, where k is a natural number, and
the p is at least one of n/2+2 and n/2−2.

7. The series multiplex inverter according to claim 3, wherein the n is 2×k+1, where k is a natural number, and
the p is at least one of n/2+½ and n/2−½.

8. The series multiplex inverter according to claim 3, wherein the n is 4×k, where k is a natural number, and
the p is at least one of n/2+1 and n/2−1.

9. The series multiplex inverter according to claim 3, wherein the n is 4×k+2, where k is a natural number, and
the p is at least one of n/2+2 and n/2−2.

10. A series multiplex inverter comprising:

power conversion circuitry including n single-phase inverters, where n is an integer of three or more, the n single-phase inverters having output terminals connected in series;

drive signal generation circuitry to generate n drive signals that cause different single-phase inverters of the n single-phase inverters to output, for the same length of time, n rectangular wave voltages sequentially out of phase; and drive signal output circuitry to output the n drive signals to the n single-phase inverters in rotation that shifts, by p every m-fold time of half an output voltage period of the power conversion circuitry, the single-phase inverters corresponding one-to-one to the n drive signals in a combination of the n drive signals with different single-phase inverters of the n single-phase inverters, where m is a natural number and p is a natural number relatively prime to n and excluding one.

* * * * *